United States Patent
Troy et al.

(10) Patent No.: US 7,859,655 B2
(45) Date of Patent: Dec. 28, 2010

(54) METHOD INVOLVING A POINTING INSTRUMENT AND A TARGET OBJECT

(75) Inventors: James J. Troy, Issaquah, WA (US); Scott W. Lea, Renton, WA (US); Gary E. Georgeson, Federal Way, WA (US); Jeffrey M. Hansen, Renton, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 12/235,161

(22) Filed: Sep. 22, 2008

(65) Prior Publication Data

US 2009/0086199 A1 Apr. 2, 2009

Related U.S. Application Data

(63) Continuation-in-part of application No. 11/863,755, filed on Sep. 28, 2007.

(51) Int. Cl.
*G01B 11/26* (2006.01)
*G01C 1/00* (2006.01)

(52) U.S. Cl. ............. 356/141.2; 356/141.3; 356/141.4; 356/614; 356/620; 700/114; 700/192; 702/95; 702/94; 348/169; 348/211.4; 348/211.7; 348/25

(58) Field of Classification Search ... 356/141.2–141.4, 356/620–623, 614; 348/169, 25, 211.4, 211.7; 702/95, 94; 700/114, 57, 59, 192
See application file for complete search history.

(56) References Cited

U.S. PATENT DOCUMENTS

| | | | | |
|---|---|---|---|---|
| 6,618,133 B2 * | 9/2003 | Hedges et al. | ........... | 356/141.4 |
| 6,630,993 B1 * | 10/2003 | Hedges et al. | ........... | 356/141.4 |
| 7,194,326 B2 * | 3/2007 | Cobb et al. | ............... | 700/114 |
| 7,305,277 B2 * | 12/2007 | Freeman et al. | ............. | 700/114 |

* cited by examiner

*Primary Examiner*—L. G Lauchman
(74) *Attorney, Agent, or Firm*—Dennis R. Plank, et al.

(57) ABSTRACT

A first method determines a position of a point of interest on a target object surface in a target object coordinate system using orientation and distance measurements of a pointing instrument in an instrument coordinate system. A second method determines an orientation of a pointing instrument in an instrument coordinate system for the instrument to be aligned with a point of interest on a target object surface having a target object coordinate system, wherein a position of the point of interest in the target object coordinate system is known. A third method controls orientation of a laser beam of a laser in an instrument coordinate system for the laser beam to trace an image on a target object surface having a target object coordinate system, wherein positions of points for the image on the surface of the target object in the target object coordinate system are known.

20 Claims, 16 Drawing Sheets

METHOD INVOLVING A POINTING INSTRUMENT AND A TARGET OBJECT

CROSS REFERENCE TO RELATED APPLICATIONS

The present application is a continuation-in-part application of U.S. patent application Ser. No. 11/863,755 filed Sep. 28, 2007, the entire disclosure of which is incorporated herein by reference.

FIELD

The present invention relates generally to pointing instruments, and more particularly to a method involving a pointing instrument and a target object.

BACKGROUND

Pointing instruments that can highlight a position or region on a target object, in the local coordinate system of that object, can provide valuable point-of-use information for applications in areas such as: manufacturing; construction; and entertainment. A system that is easy to set up and use and is affordable would enable many types of positional applications that may have been hard to justify using existing systems that can perform object targeting. There are costly, commercially available pointing instrument systems and methods of operation which allow the instrument to perform distance measurements or project patterns onto a surface. Examples include interferometer based trackers, electronic distance measurement laser-based systems, surveying and construction equipment, motion capture systems, and laser projection systems such as laser radar projection systems. A disadvantage of the existing systems is the high cost of the equipment, as described above, as well as the costs associated with the extensive user training required to use some of these systems.

Existing laser projection systems, like those used to indicate contour locations for manufacturing applications or to project images for laser light shows, use methods which typically project only onto flat surfaces. This limits the potential projected surfaces to flat targets that are perpendicular to the laser alignment, and for displays which are expected to be viewed with the proper perspective from locations with narrow viewing angle. If the viewing angle is not close to zero, the resulting display image will be distorted.

What is needed is an improved method involving a pointing instrument which allows, in one example, a more affordable pointing instrument system to be used.

SUMMARY

A first method is for determining a position of a point of interest on a surface of a target object having a target object coordinate system using a pointing instrument having an aim point axis and having an instrument coordinate system. The first method includes measuring an orientation of the aim point axis in the instrument coordinate system when the aim point axis of the instrument is in turn aligned with each of three calibration points on the surface of the target object, wherein positions of the three calibration points in the target object coordinate system are known. The first method also includes measuring a distance substantially along the aim point axis from the instrument to each of the three calibration points. The first method also includes calculating a calibration matrix which transforms a position defined in the instrument coordinate system to a position defined in the target object coordinate system using at least the measured orientation and distance in the instrument coordinate system corresponding to the three calibration points and the known positions of the three calibration points in the target object coordinate system. (In some embodiments the calibration matrix is sometimes referred to as a "camera pose" matrix.) The first method also includes measuring an orientation of the aim point axis in the instrument coordinate system when the aim point axis of the instrument is aligned with the point of interest. The first method also includes calculating a position of the point of interest in the target object coordinate system using at least the measured orientation of the aim point axis in the instrument coordinate system corresponding to the point of interest, the calibration matrix, and at least one of a distance substantially along the aim point axis from the instrument to the point of interest and a model of the surface of the target object in the target object coordinate system. The first method also includes storing the calculated position.

A second method is for determining an orientation of an aim point axis of a pointing instrument having an instrument coordinate system for the aim point axis of the instrument to be aligned with a point of interest on a surface of a target object having a target object coordinate system, wherein a position of the point of interest in the target object coordinate system is known. The second method includes calculating an inverse calibration matrix which transforms a position defined in the target object coordinate system to a position defined in the instrument coordinate system. The second method also includes calculating the orientation of the aim point axis of the instrument in the instrument coordinate system using at least the inverse calibration matrix, the position of the point of interest in the target object coordinate system, and inverse kinematics of the instrument. The second method also includes rotating the aim point axis of the instrument to the calculated orientation.

A third method is for controlling orientation of a laser beam of a laser having an instrument coordinate system for the laser beam to trace an image on a surface of a target object having a target object coordinate system, wherein positions of points for the image on the surface of the target object in the target object coordinate system are known. The third method includes calculating an inverse calibration matrix which transforms a position defined in the target object coordinate system to a position defined in the instrument coordinate system. The third method also includes calculating orientations of the laser beam of the laser in the instrument coordinate system using at least the inverse calibration matrix, the positions of the points for the image on the surface of the target object in the target object coordinate system, and inverse kinematics of the instrument. The third method also includes rotating the laser beam to the calculated orientations to trace the image on the surface of the target object.

Several benefits and advantages are derived from one or more of the first, second, and third methods. In one example of the first method, using just three calibration points allows for a faster method and less costly instrument for determining the position of the point of interest in the target object coordinate system from its position in the instrument coordinate system. In one example of the second method, using the inverse of a calibration matrix allows for a faster method and less costly instrument for orientating the instrument in the instrument coordinate system to align the aim point axis with a point of interest having a position known in the target object coordinate system. In one example of the third method, using the inverse of a calibration matrix should allow for a faster method and less costly instrument for orientating a laser in the instrument coordinate system to trace an image on a target object when positions of points for the image on the surface of the target object in the target object coordinate system are known. In the same or a different example of the third method, the traced image is a perspective-corrected image on the surface of a three-dimensional target object.

DRAWINGS

Figure 9:
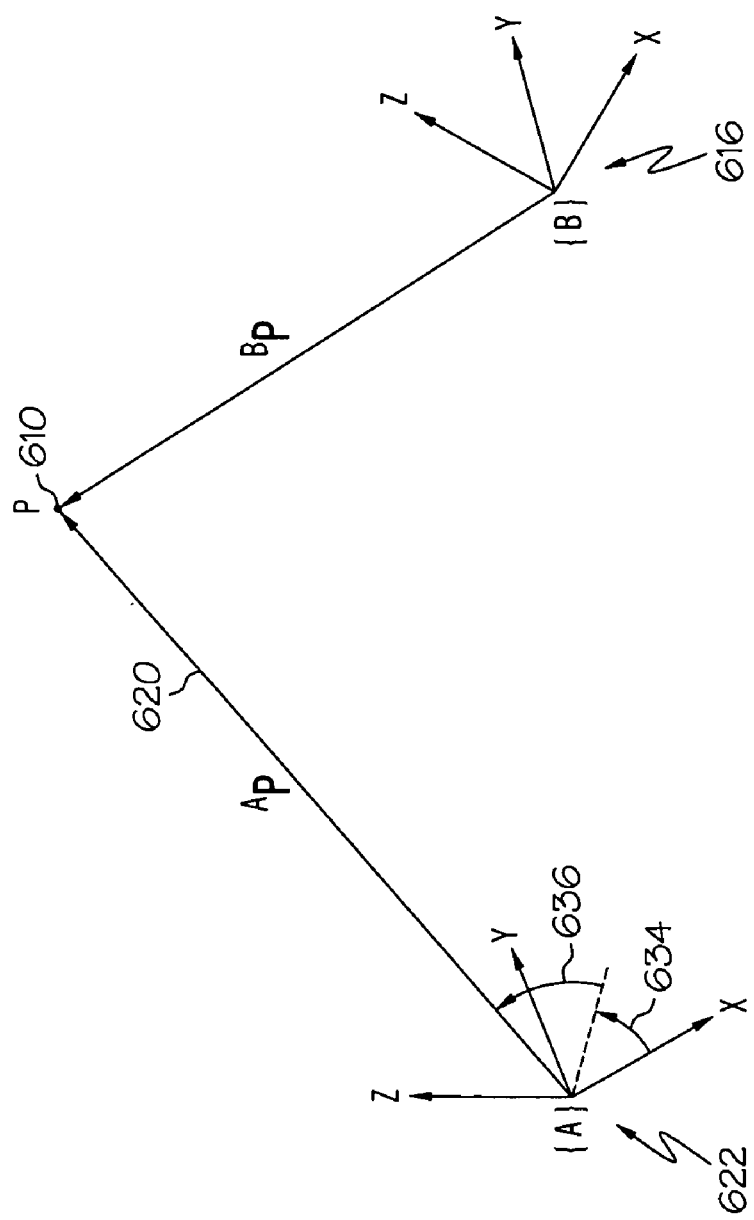
Figure 10:
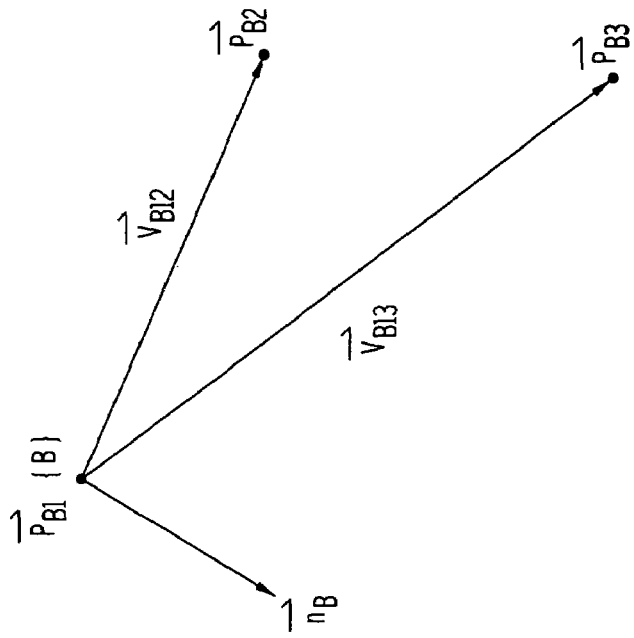
Figure 10:
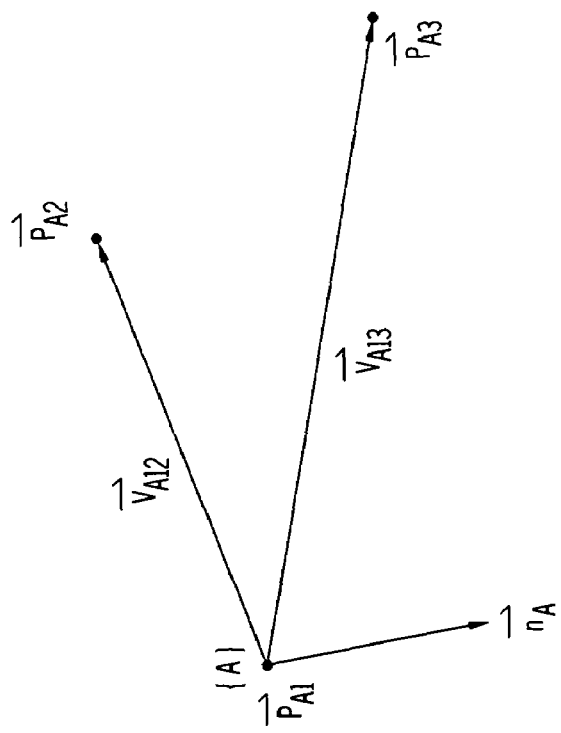
Figure 11:
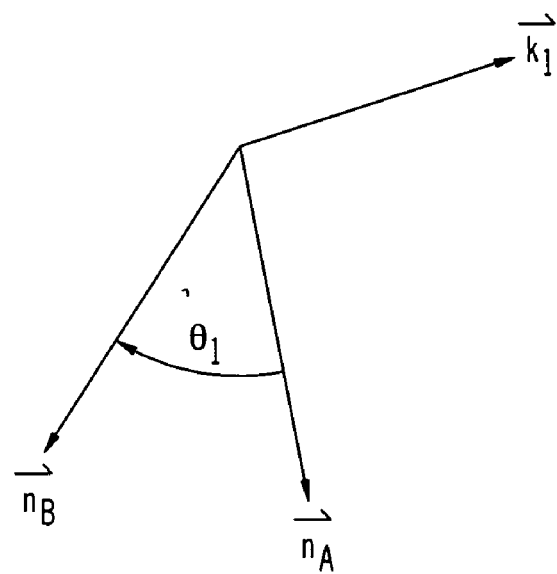
Figure 12:
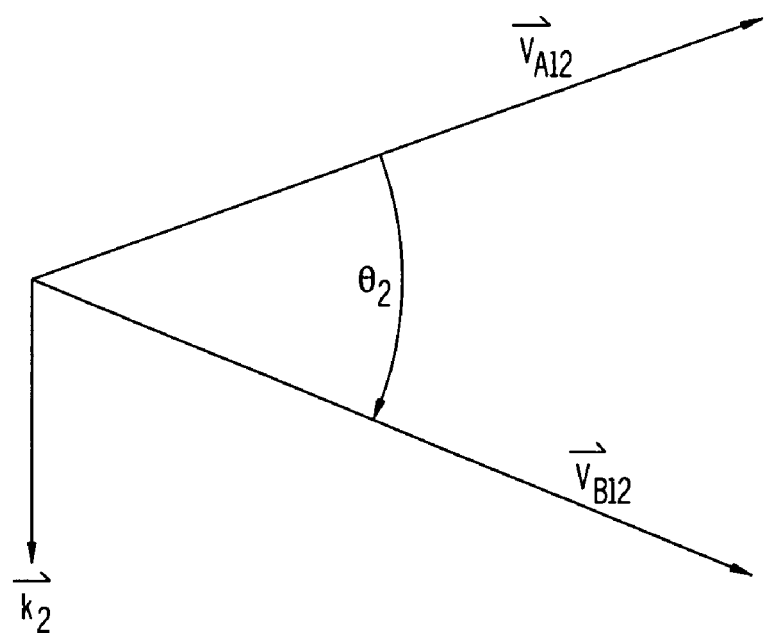
Figure 13:
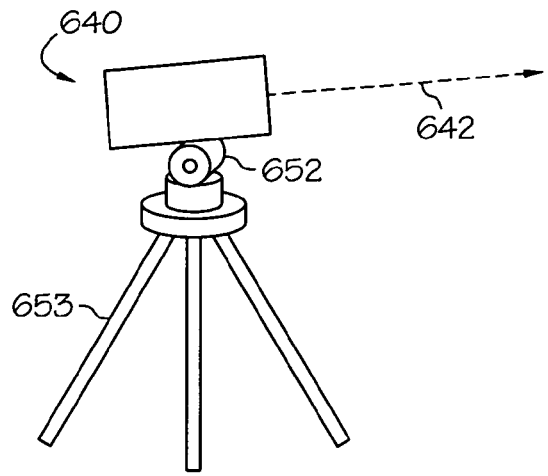
Figure 14:
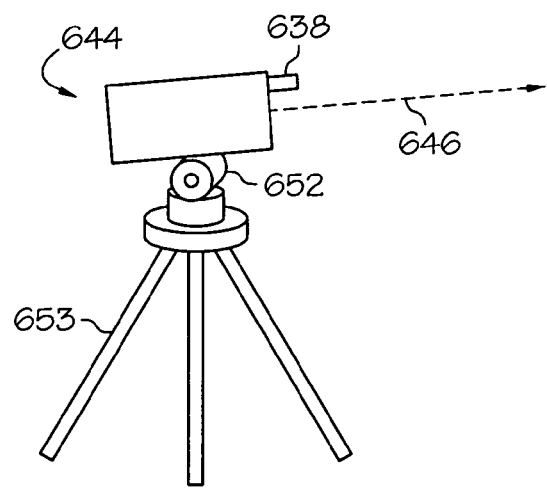
Figure 15:
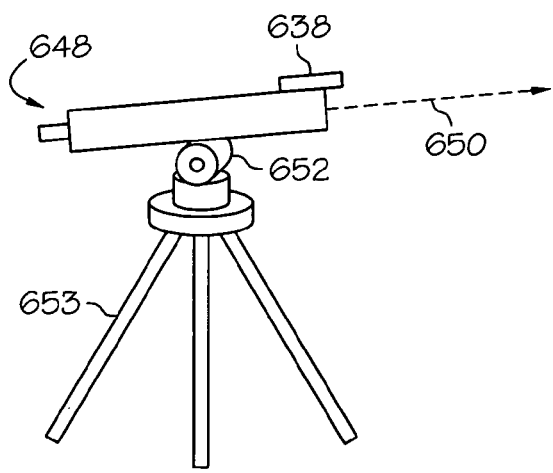
Figure 16A:
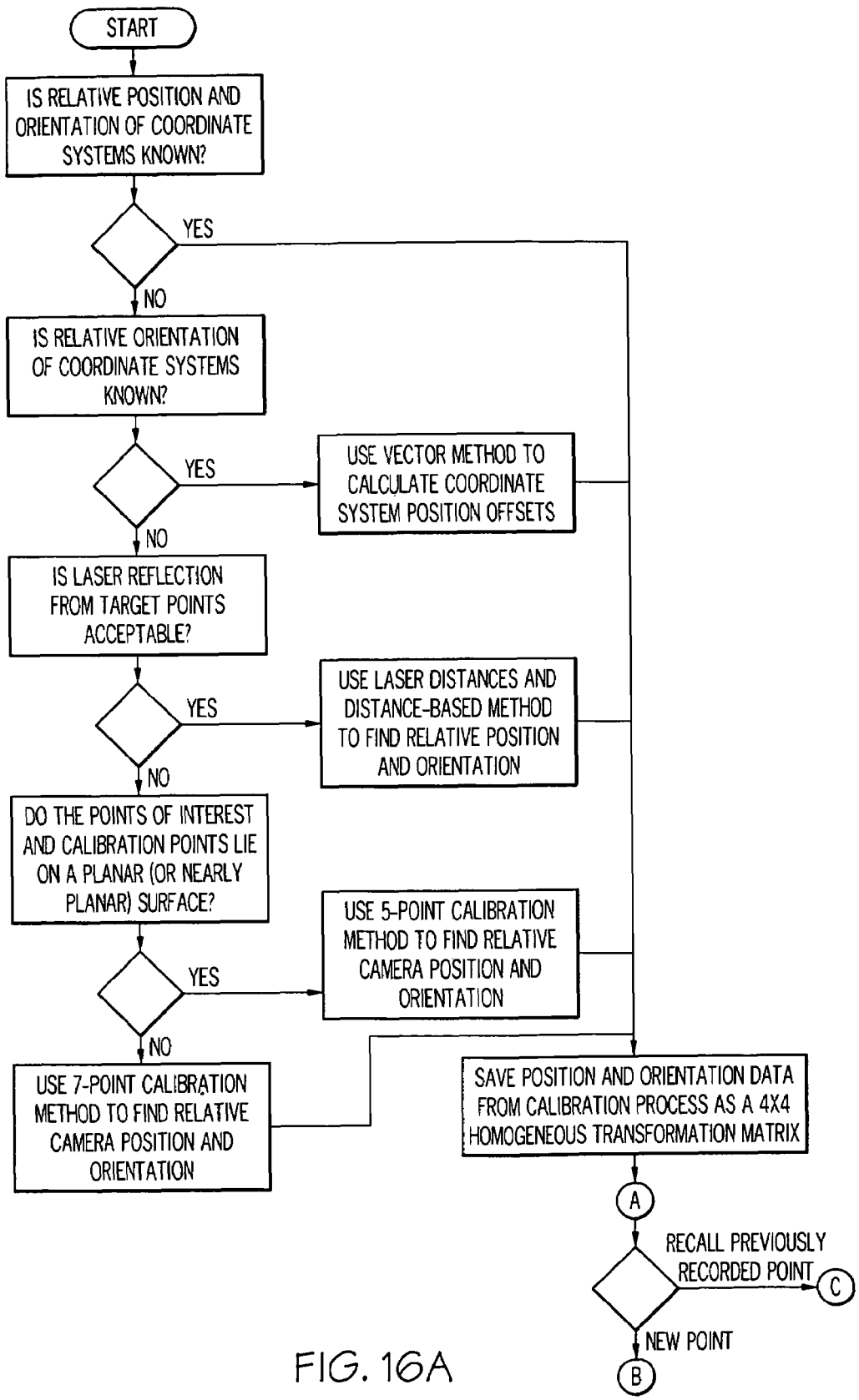
Figure 16B:
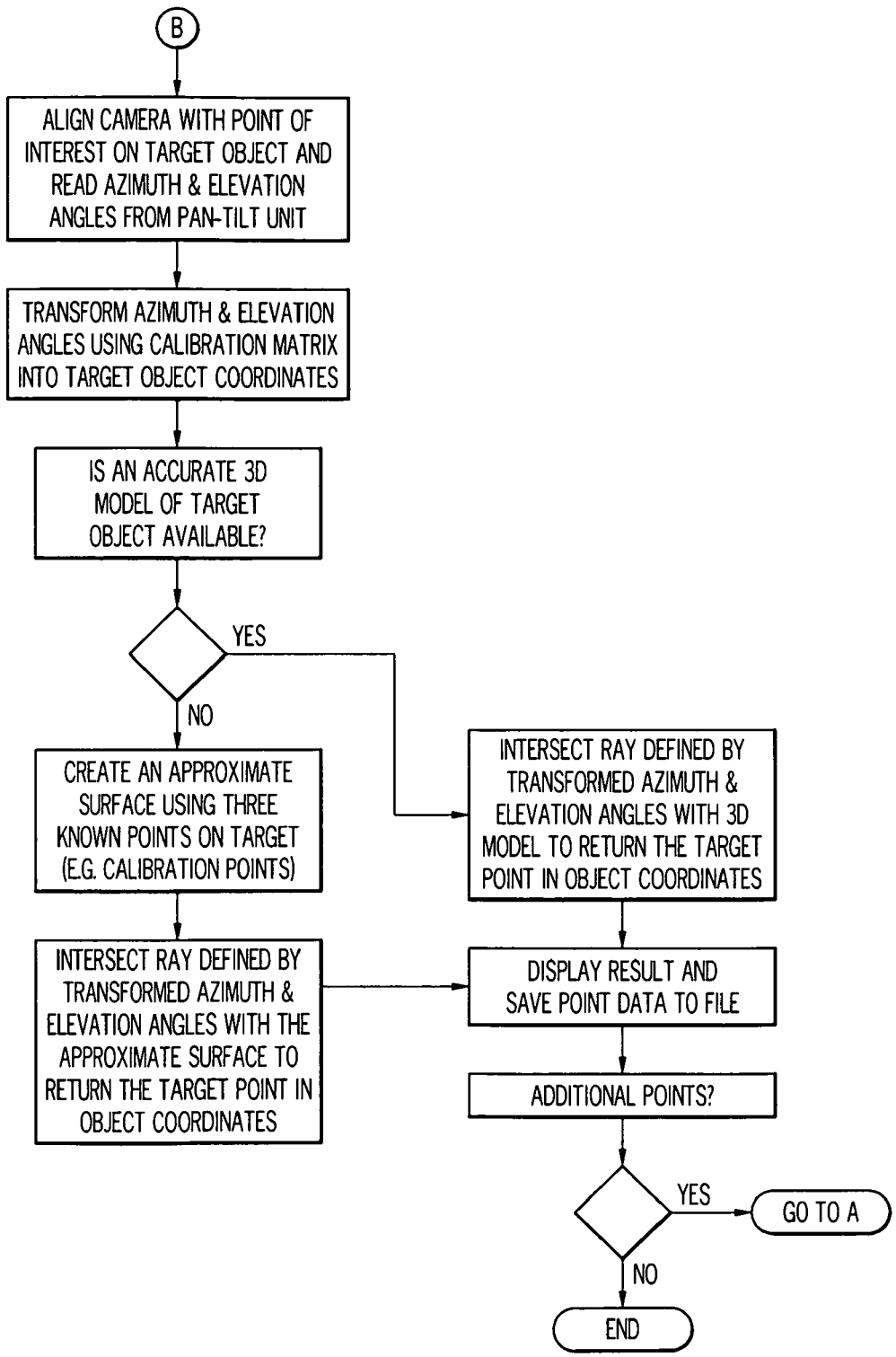
Figure 16C:
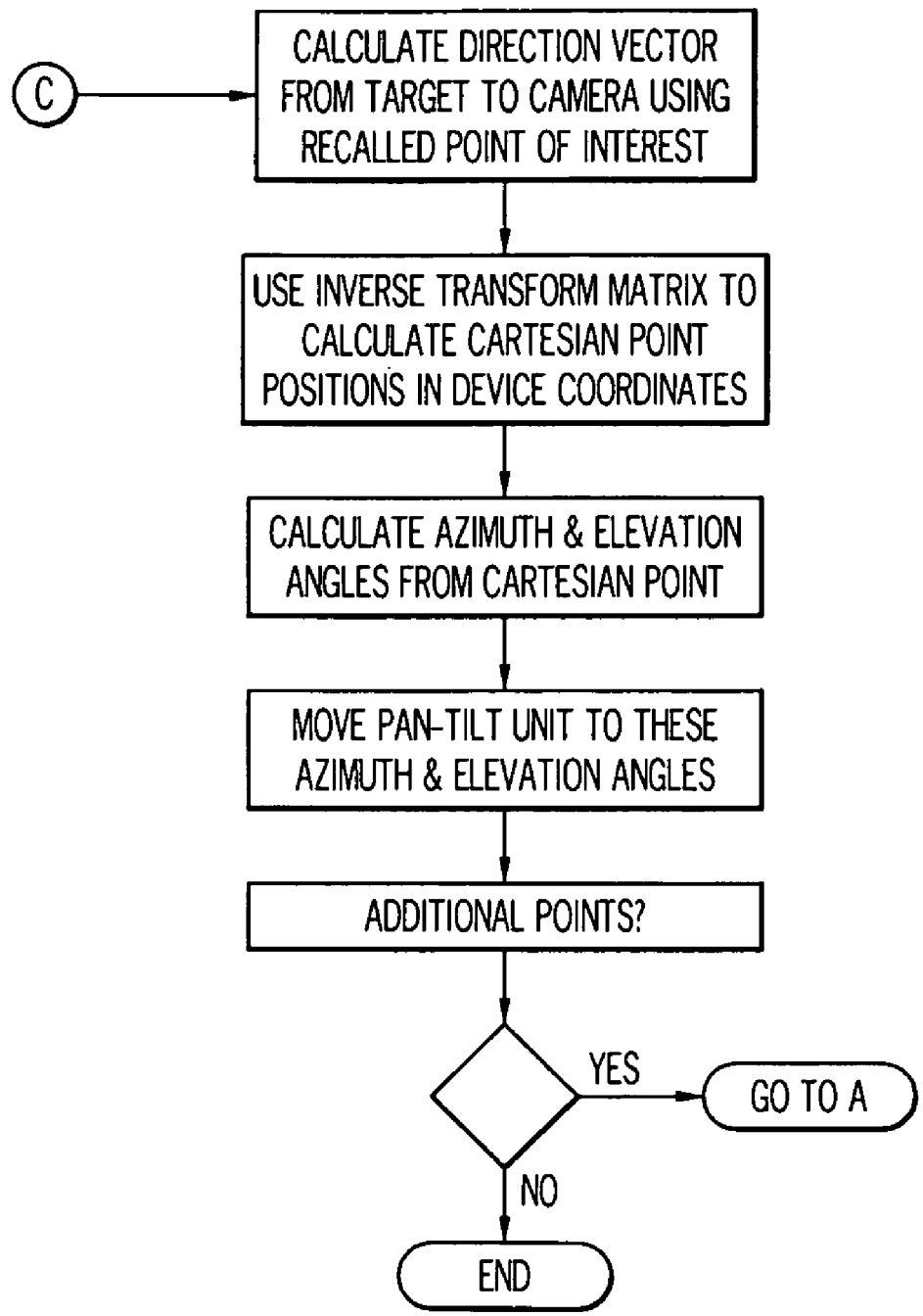
Figure 17:
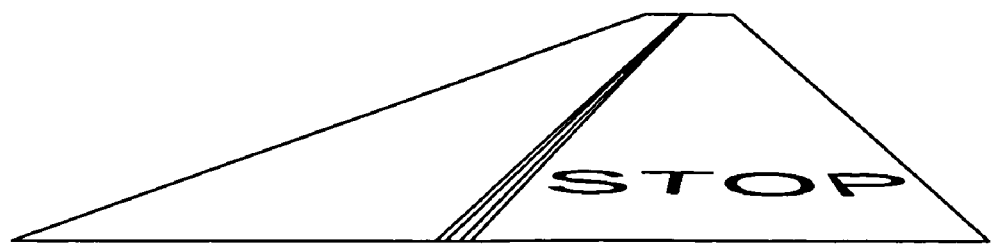
Figure 18:
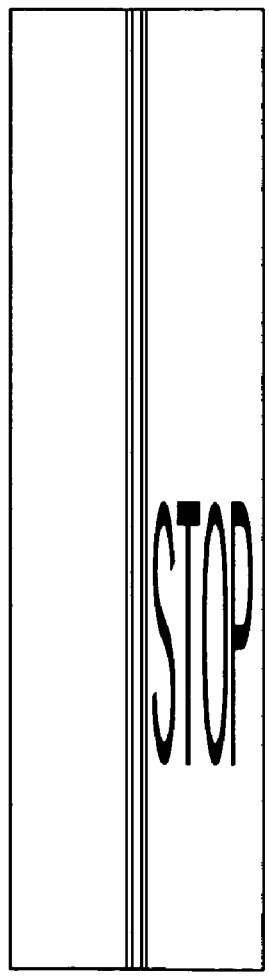
Figure 19:
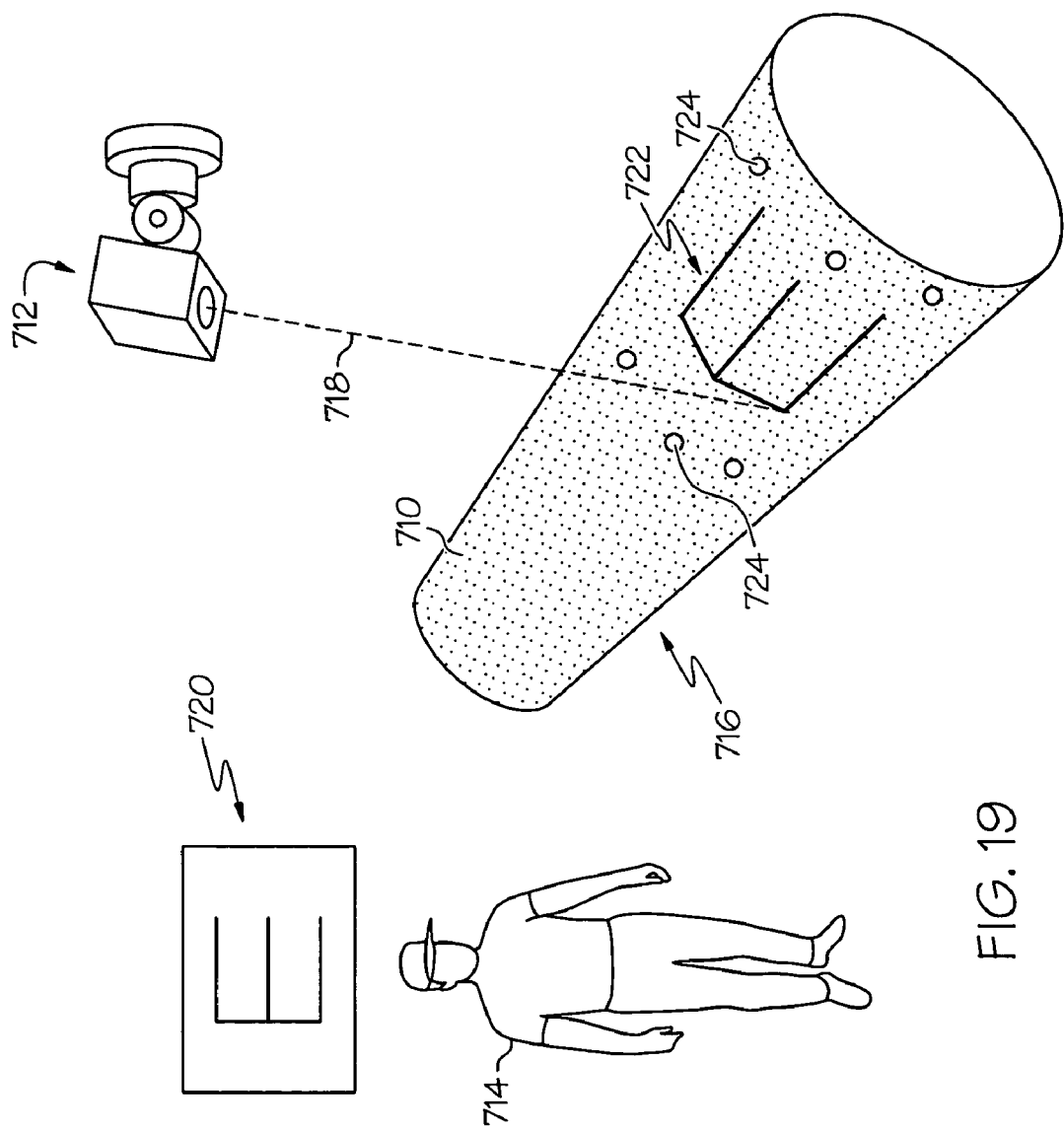

FIG. 9 is a diagram of an illustrative embodiment of an instrument coordinate system {A} and a target object coordinate system {B} showing a position vector $^{A}P$ extending from the origin of the instrument coordinate system substantially along the aim point axis of the instrument to a point of interest P and showing a position vector $^{B}P$ extending from the origin of the target object coordinate system to the point of interest P;

FIGS. 10-12 are explanatory diagrams helpful in understanding an illustrative method for calculating a calibration matrix for coordinate system transformation;

FIG. 13 is a schematic view of an illustrative embodiment of a pointing instrument which includes a laser having laser range finder capabilities;

FIG. 14 is a schematic view of an illustrative embodiment of a pointing instrument which includes a video camera and a laser range finder;

FIG. 15 is a schematic view of an illustrative embodiment of a pointing instrument which includes a telescope and a laser range finder;

FIGS. 16A, 16B, and 16C together depict an illustration of a process flow diagram which describes one example of a particular method involving initial calibration and position targeting;

FIG. 17 is an illustration of a perspective-corrected, driver's view of the word "STOP" painted on a roadway;

FIG. 18 is an illustration of how the word "STOP" of FIG. 17 looks from a bird's-eye view above the roadway; and FIG. 19 is an illustrative application for a viewer-corrected display (i.e., perspective-corrected image).

DESCRIPTION

Figure 1:
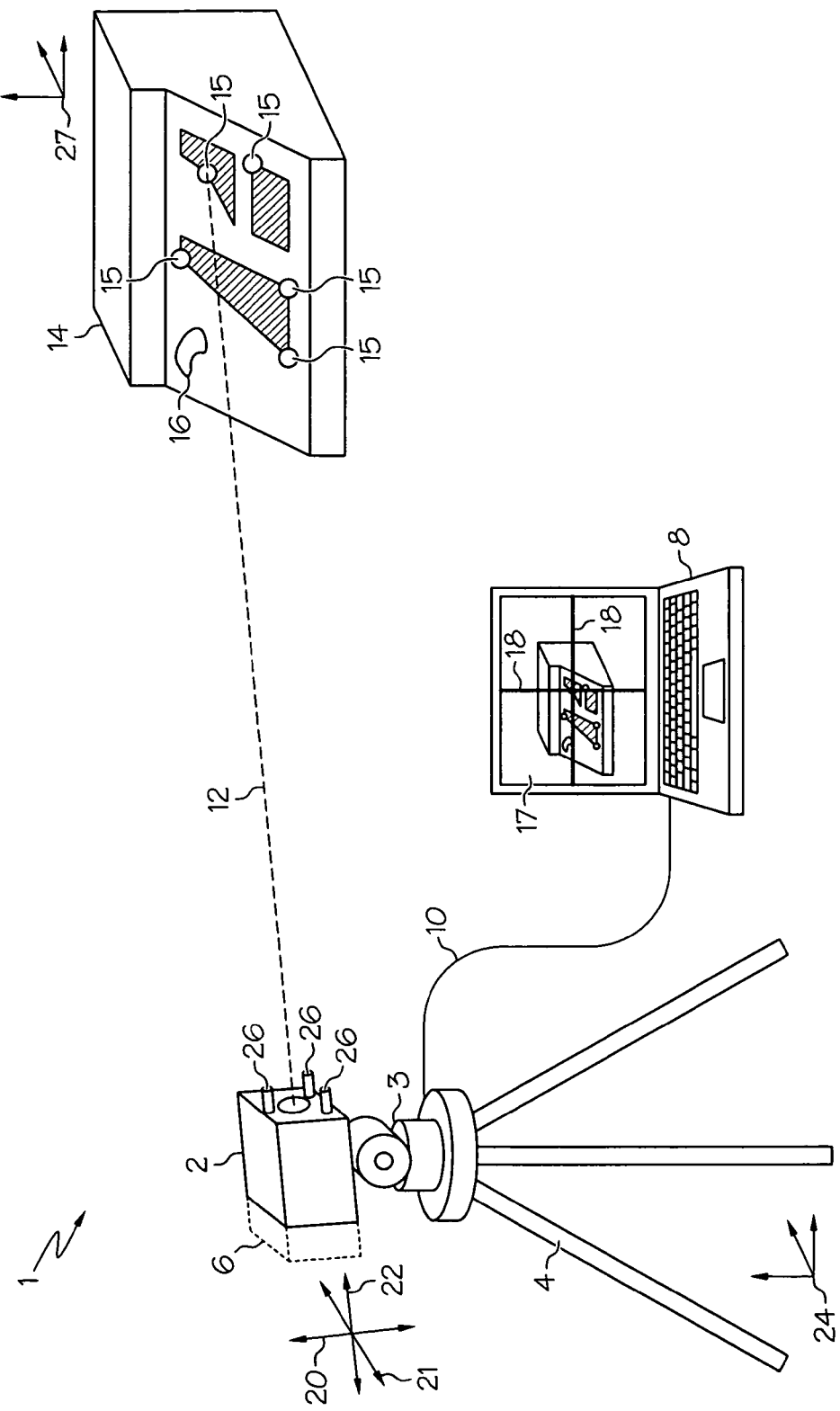
FIG. 1 is a partially schematic perspective view of an illustrative embodiment of the local positioning system.

Referring initially to FIG. 1, an illustrative embodiment of the local positioning system, hereinafter system, is generally indicated by reference numeral 1. The system 1 may include a video camera 2 which may have automated (remotely controlled) zoom capabilities. In one particular embodiment, camera 2 is a FCB-EX1010 camera from Sony Electronics® Inc. The video camera 2 may additionally include an integral crosshair generator to facilitate precise locating of a point within an optical image field display 17 of the video camera 2. In applications in which the crosshair generator is not an integral component of the video camera 2, a crosshair generator 6 (shown in phantom) may be connected to the video camera 2 as a separate element for this purpose or overlaid on the video stream on the PC or display device.

The video camera 2 may be provided on a pan-tilt mechanism 3 which may be mounted on the tripod support 4 or alternative support. In one particular embodiment, the pan-tilt mechanism 3 is the PTU-D46-70 by Directed Perception®. The pan-tilt mechanism 3 may be capable of positionally adjusting the video camera 2 to selected angles around the vertical, azimuth (pan) axis 20 and the horizontal, elevation (tilt) axis 21, as well as rotation of the video camera 2 to selected angles about a roll camera axis 22. For the implementation discussed here, measurement and control of the roll axis is not required.

A direction vector that describes the orientation of the camera relative to the fixed coordinate system 24 of the tripod 4 (or other platform on which the pan-tilt unit is attached) is determined from the azimuth and elevation angles, as well as the position of the center of crosshair marker in the optical field when the camera is aimed at a point of interest 16. For simplicity, we are using the center of the image for the location of the crosshair display, but other locations could be used provided that the angles are modified to compensate for the difference. This direction vector can be thought of as a line 12 extending from the lens of the camera and intersecting a location 15 on target object 14.

The video camera 2 and the pan-tilt mechanism 3 may be operated by a computer 8 which may be a notebook computer, for example. The computer 8 may communicate with the video camera 2 and the pan-tilt mechanism 3 through a video/control cable 10. Alternatively, the computer 8 may communicate with the video camera 2 and the pan-tilt mechanism 3 through a wireless communication pathway (not shown). Alternatively, the computer may be integrated with the camera. Control of the pan-tilt mechanism 3 and therefore, the orientation of the video camera 2 may be controlled using the computer 8 keyboard, mouse (not shown), track ball (not shown), or other input device. The optical image field 17, with crosshair overlay 18, is sighted by the video camera 2 may be displayed on the monitor of the computer 8.

Three-dimensional localization software may be loaded onto the computer 8. The 3-D localization software may use multiple calibration points 15 at a distance on an target object 14 such as an aircraft, for example, to define the location (position and orientation) of the video camera 2 relative to the target object 14. In some applications, the 3D localization software may utilize a minimum of three calibration points 15 on the target object 14, in combination with pan and tilt data from the pan-tilt mechanism 3, to define the relative position and orientation of the video camera 2 with respect to the target object 14. The calibration points 15 may be visible features of known position in the local coordinate system of the target object 14 as determined from a 3-D CAD model or other measurement technique. The calibration points 15 may be used in coordination with the azimuth and elevation angles from the pan-tilt mechanism 3 to solve for the camera position and orientation relative to the target object.

Once the position and orientation of the video camera 2 with respect to the target object 14 is determined, the computer 8 may be operated to rotate and zoom the optical image field of the video camera 2 to a desired location 16 of unknown position on the target object 14, which may be a damage/repair location on an aircraft, for example. At this position of the direction vector, the orientation of the video camera 2 (which may include the angle of the video camera 2 along the azimuth axis 20 and the elevation axis 21) may be recorded. By using the azimuth and elevation angles from the pan-tilt unit and the relative position and orientation of the camera determined in the calibration process, the location of the point of interest 16 can be determined relative to the coordinate system 27 of the target object 14. The damage/repair location 16 on the target object 14 may be sized by aligning the crosshairs 18 in the optical image field of the video camera 2 along the boundary of the damage/repair location.

The reverse process, in which the position of a point of interest 16 may be known in the target object's coordinate system (from a previous data acquisition session, a CAD model, or other measurement), can also be performed. In this situation, the camera may be placed in any location the work area where calibration points are visible (which may be in a different location than the location where the original data was recorded) and the camera pose calibration step may be performed. The direction vector 12 from the point of interest to the camera may be calculated in the target object's coordinate system 27. The inverse of the camera pose transformation matrix may be used to convert the direction vector into the coordinate system of the camera. The azimuth and elevation angles may then be calculated and used by the pan-tilt unit to aim the camera at the point of interest on the target object.

In some applications, at least one (such as three, for example) laser pointer 26 may be mounted on the camera and aligned with the direction vector 12. The at least one laser pointer 26 may provide a visual indication on the target object 14 as to the aim or direction of the video system 2. This sighting feature provided by the laser pointers 26 may be helpful in aiding rapid selection of positional calibration points 15 and points of interest 16 on the target object 14, since the intersection of the laser beams (not shown) emitted from the laser pointers 26 with the target object 14 are visible to the naked eye. Use of the laser pointers can also be useful when recalling points in the target object's coordinate system (which could be previous repair locations or other points of interest) by showing the location on the target object.

In alternate embodiments of this concept, the camera may be replaced with an optical instrument, like a telescope. Also the automated (motor driven) pan-tilt mechanism could be replaced by one that can be positioned manually. The only functional requirement is that the azimuth and elevation angles can be read and entered into the localization application.

In another alternate embodiment of this concept, the system can be integrated into an application connected to the internet, such as a Web-enabled application, which could be either wired or wireless. In this type of application, remote users, or other automated software agents, can operate the camera and pan-tilt unit, and then receive the processed localization data for objects within visual range of the system.

In typical implementation of the system 1, the video camera 2 may be set up within about 40-50 feet of the target object 14. The target object 14 may be the skin of an aircraft, for example and without limitation. The calibration points 15 on the target object 14 may be selected and used by the 3-D localization software loaded onto the computer 8 in conjunction with the pan and tilt data (i.e., the azimuth and elevation angles) from the pan-tilt mechanism 3 to determine the position and orientation of the video camera 2 with respect to the target object 14. The calibration points 15 may be feature points of known position in the local coordinate system of the target object 14 as determined from a 3-D CAD model or other measurement technique. In some implementations, the pan-tilt unit 3 may be attached to a portable support, such as a tripod or other mobile device. In other implementations, the pan-tilt unit could be attached to stationary support, such as the walls of an airplane hangar.

The 3-D localization software loaded onto the computer 8 may determine the position and orientation of the video camera 2 with respect to the target object 14 and generate a camera pose transformation matrix using one of three methods: (1) vector-based approach; (2) position and orientation based on 5-point technique or 7-point techniques; and (3) laser hybrid system. The vector-based approach may utilize three calibration points 15 on the target object 14 and solves simultaneous equations to determine the position of the video camera 2 with respect to the target object 14. This assumes the relative orientation of the camera is known. The position and orientation calibration based on 5-point or 7-point techniques may determine both the position (x, y, z) and the orientation (roll, pitch, yaw) of the video camera 2 relative to the target object 14. The 5-point method may utilize five known calibration points 15 that all lie on the same planar surface of the target object 14. The 7-point method may utilize seven known calibration points 15 that are not all on the same planar surface of the target object 14. One particular embodiment of the process uses a modified version of the 5- and 7-point methods as described by the following publication (incorporated herein by reference): Tsai, R., "A Versatile Camera Calibration Technique for High-Accuracy 3D Machine Vision Metrology Using Off-the-Shelf TV Cameras and Lenses", IEEE Journal of Robotics and Automation, Vol. RA-3, No. 4, pp 323-344, 1987. It has been modified to use pan-tilt data instead of pixel location data to accomplish the calibration process.

In alternate embodiments, an off-the-shelf laser-based distance measurement device (not shown) may be integrated into the system to create a laser hybrid system, which may be incorporated onto the pan-tilt mechanism 3 and may use measurement data from the laser to obtain an estimate of the distance from the video camera 2 to the calibration points 15 on the target object 14. In this configuration, the distance data from the optional laser-based distance measurement device may be used in combination with the vector and 5-point/7-point techniques to provide a more accurate calculation, in some conditions, of the position and orientation of the camera relative to the target object, as well as determining the location of points of interest on the target object. Note that this optional laser-based distance measurement device is not the same as the optional laser pointer 26.

In alternate embodiments, the localization software may be written into firmware on a chip for use in embedded applications without requiring the use of a PC.

Once the position and orientation of the video camera 2 with respect to the target object 14 are determined and the camera pose transformation matrix generated, camera pan data (angle of rotation of the video camera 2 about the azimuth axis 20) and tilt data (angle of rotation of the video camera 2 with respect to the elevation axis 21) may be used in conjunction with the calculated position and orientation of the video camera 2 to determine the X, Y and Z positions of any point of interest (such as the damage/repair location on the skin of the aircraft) on the target object 14 in the coordinate system of the target object 14. The video camera 2 may then be aimed at the damage/repair location on the target object 14, with the center and/or outline of the damage/repair location defined. Although not required for all situations, reflective tape (not shown) may be provided on feature locations used for calibration and on or around the edges or perimeter of the damage/repair location to assist the optional laser-based distance measurement device in achieving a more visible reflection from the damage-repair location.

Because the position of the damage/repair location on the target object 14 may not initially be known, the pan and tilt angles of the pan-tilt mechanism 3 may be used to determine the direction vector in the local camera coordinate system of the video camera 2. Determination of the surface position of the damage/repair location may be made by any one of the following methods: 1. an approximation using the ray intersection from a polygonal surface formed from the calibration points, or other user selected features of know position on the target object; 2. 3-D data from a CAD model, for example; 3. the distance from the optional laser-based measurement device. At this step, the camera pose transformation matrix may be used to transform or convert the damage/repair location, which is initially defined in the local camera coordinates, into the coordinate system of the target object 14.

The 3-D model coordinate system and maintenance database of the target object 14 may then be accessed by the computer 8 to locate previous locations of damage, repairs and/or other issues on the target object 14. Present repair of the damage/repair location on the target object 14 may then be planned and completed based on the positional and geometric relationships of the previous damage, repairs and/or issues with the damage/repair location. The positional and geometric information of the video camera 2 when the optical image field of the video camera 2 is aimed at the damage/repair location may be saved and superimposed on the 3-D model, which may be maintained in a database. Digital photographs of the damage/repair location may additionally be taken using the video camera 2 or other camera and saved in the database. Accordingly, the updated database is available in the event that a subsequent repair of the target object 14 is necessary.

Figure 2:
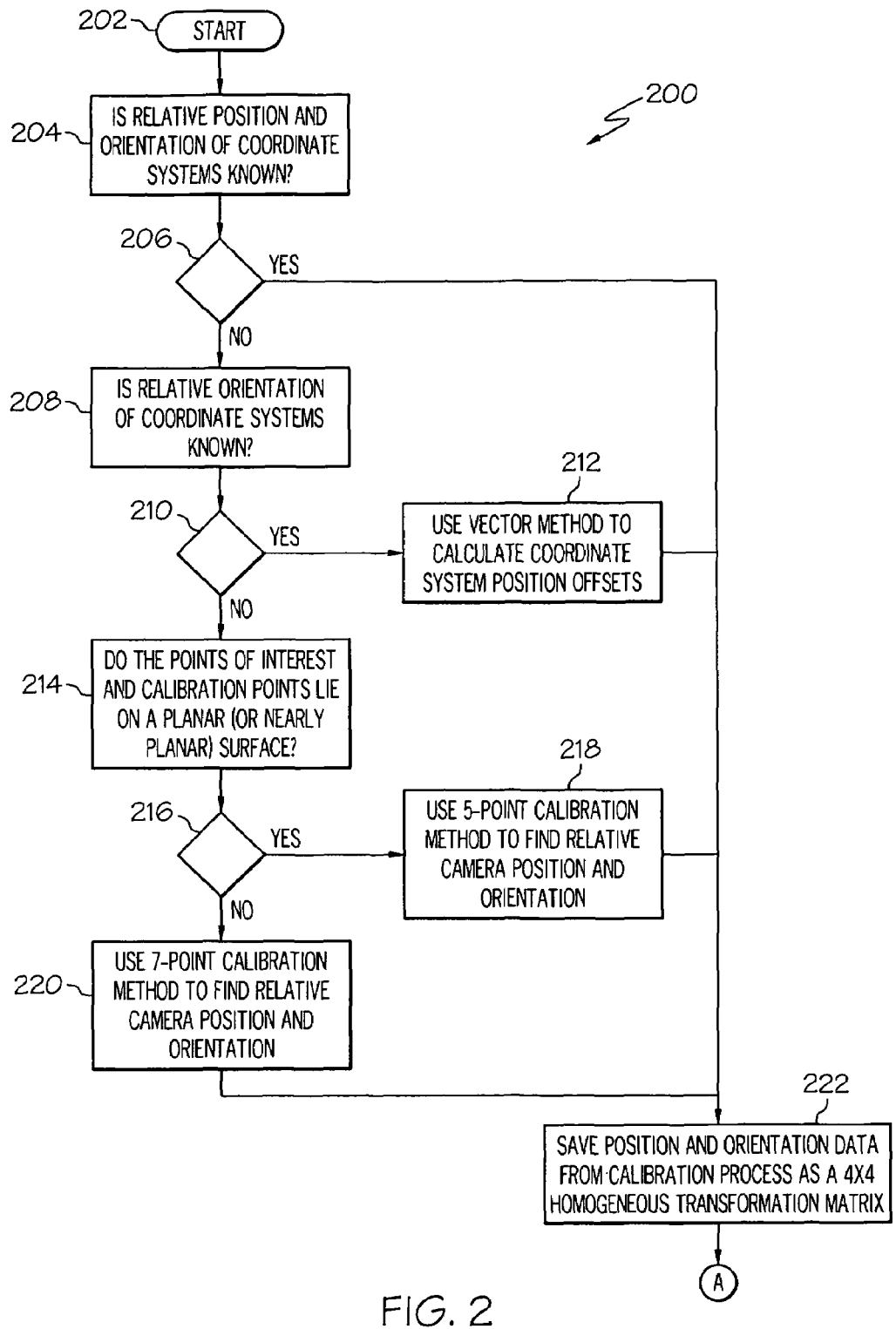
FIG. 2 is a flow diagram which illustrates steps implemented to generate a camera pose transformation matrix.

Referring next to FIG. 2, a flow diagram 200 which illustrates steps implemented to generate a camera pose transformation matrix is shown. The method 200 begins at block 202 in FIG. 2. In block 204, a determination may be made as to whether the relative position and orientation of coordinate systems is known. If the answer to the query posed in block 204 is "yes" in block 206 (the position and orientation of the camera coordinate system relative to the target object is known), then the position and orientation data from the calibration process may be saved for the camera pose as a 4×4 homogeneous transformation matrix in block 222.

If the answer to the query posed in block 204 is "no" in block 206 (at least one of the relative position and orientation of coordinate systems is unknown), then a determination may be made as to whether the relative orientation of coordinate systems is known in block 208. If the answer to the question posed in block 208 is "yes" in block 210 (the relative orientation of coordinate systems is known) then a vector method may be used to calculate coordinate system position offsets in block 212. If the answer to the question posed in block 208 is "no" in block 210 (the relative orientation of coordinate systems is not known), then a determination may be made in block 214 as to whether the calibration points and the points of interest lie on a planar or nearly planar surface.

If the answer to the query posed in block 214 is "yes" in block 216 (the points of interest and the calibration points do lie on a planar or nearly planar surface), then a 5-point calibration method may be used to find both the position and orientation of the camera relative to the target object in block 218. If the outcome of the query which is posed in block 214 is "no" in block 216 (the points of interest and the calibration points do not lie on a planar or nearly planar surface), then a 7-point calibration method may be used to find the position and orientation camera relative to the target object in block 220. The method may then proceed to block 222, in which the position and orientation data from the calibration process may be saved for the camera pose as a 4×4 homogeneous transformation matrix.

Figure 3:
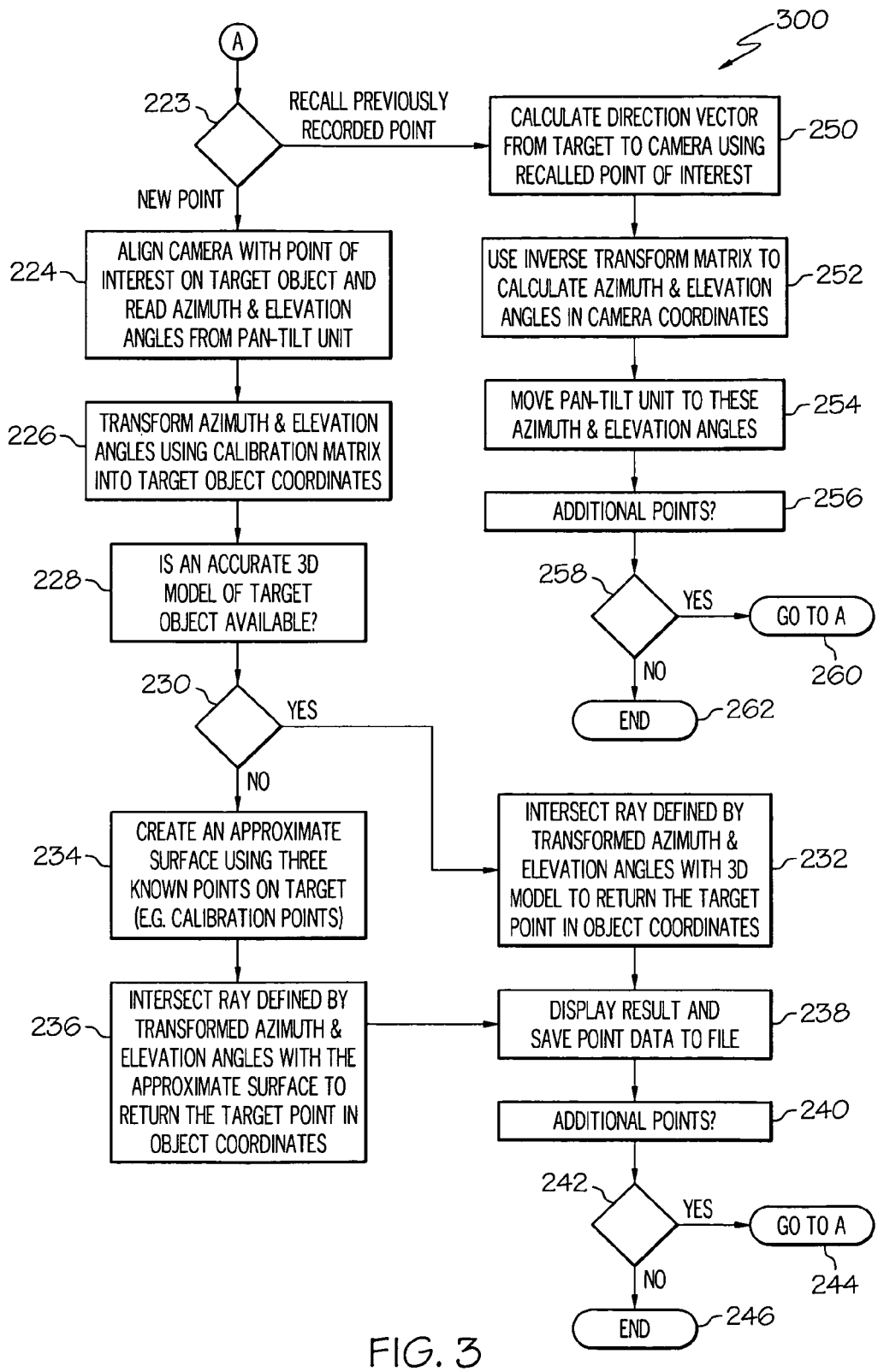
FIG. 3 is a continuation of the flow diagram of FIG. 2 which illustrates steps implemented to locate a desired position on a target object.

Referring next to FIG. 3, a flow diagram 300, which is a continuation of the flow diagram in FIG. 2, illustrates steps implemented to locate a desired position of interest on a target object is shown. After the position and orientation data from the calibration process are saved for the camera pose as a 4×4 homogeneous transformation matrix in block 222 of FIG. 2, if the answer to the query posed in block 223 is "new point", then in block 224 a camera may be aligned by the pan-tilt unit with a point of interest on a target object and the azimuth and elevation angles of the camera (which defines the direction vector 12 of FIG. 1) may be determined. In block 226, the azimuth and elevation angles determined in block 222 may be transformed into target object coordinates using the calibration matrix which was saved in block 222 of FIG. 2. In block 228, a determination is made as to whether an accurate three-dimensional model of the target object is available. If an accurate 3-D model of the target object is available in block 230, then the direction vector 12 defined by the transformed azimuth and elevation angles, may be transformed into the coordinate system of the target object by the calibration matrix and then is intersected with the 3-D model of the target object to return the target point in object coordinates in block 232. The result of the calculation made in block 232 may be displayed and the point data may be saved to file in block 238. In block 240, a query may be made as to whether additional points of interest on the target object are necessary. If additional points of interest on the target object are necessary (block 242), then the method may return to block 224 via block 244. If additional points of interest on the target object are not necessary (block 242), then the method may end at block 246.

If the answer to the query posed in block 228 is "no" in block 230 (an accurate 3-D model of the target object is not available), then an approximate surface using three known points (such as calibration points) on the target object may be created in block 234. Next, in block 236 the direction vector 12 which is defined by the azimuth and elevation angles is transformed by the calibration matrix save in block 222 and is then intersected with the approximate surface which was created in block 234 to return the target point in object coordinates. The result of the calculation made in block 236 may be displayed and the point data may be saved to file in block 238. In block 240, a query may be made as to whether additional points of interest on the target object are necessary. If the answer to the query posed in block 240 is "yes" in block 242 (additional points of interest on the target object are necessary), then the method may return to block 223 via block 244. If the answer to the query posed in block 240 is "no" in block 242 (additional points of interest on the target object are not necessary), then the method may end at block 246.

If the answer to the query posed in block 223 is "recall previously recorded point", then the desired point interest is from entered (e.g. selected from the CAD model, entered from the keyboard, or recalled from storage in another manner) and is used to calculate the direction vector 12 from the position on the target object to the camera in block 250. This direction vector is then converted into azimuth and elevation angles in camera coordinates using the inverse of the camera calibration transformation matrix in block 252. The pan-tilt unit is then moved to these angles in block 254. In block 256, a query may be made as to whether additional points of interest on the target object are necessary. If the answer to the query posed in block 256 is "yes" in block 258 (additional points of interest on the target object are necessary), then the method may return to block 223 via block 260. If the answer to the query posed in block 256 is "no" in block 258 (additional points of interest on the target object are not necessary), then the method may end at block 262.

Figure 4:
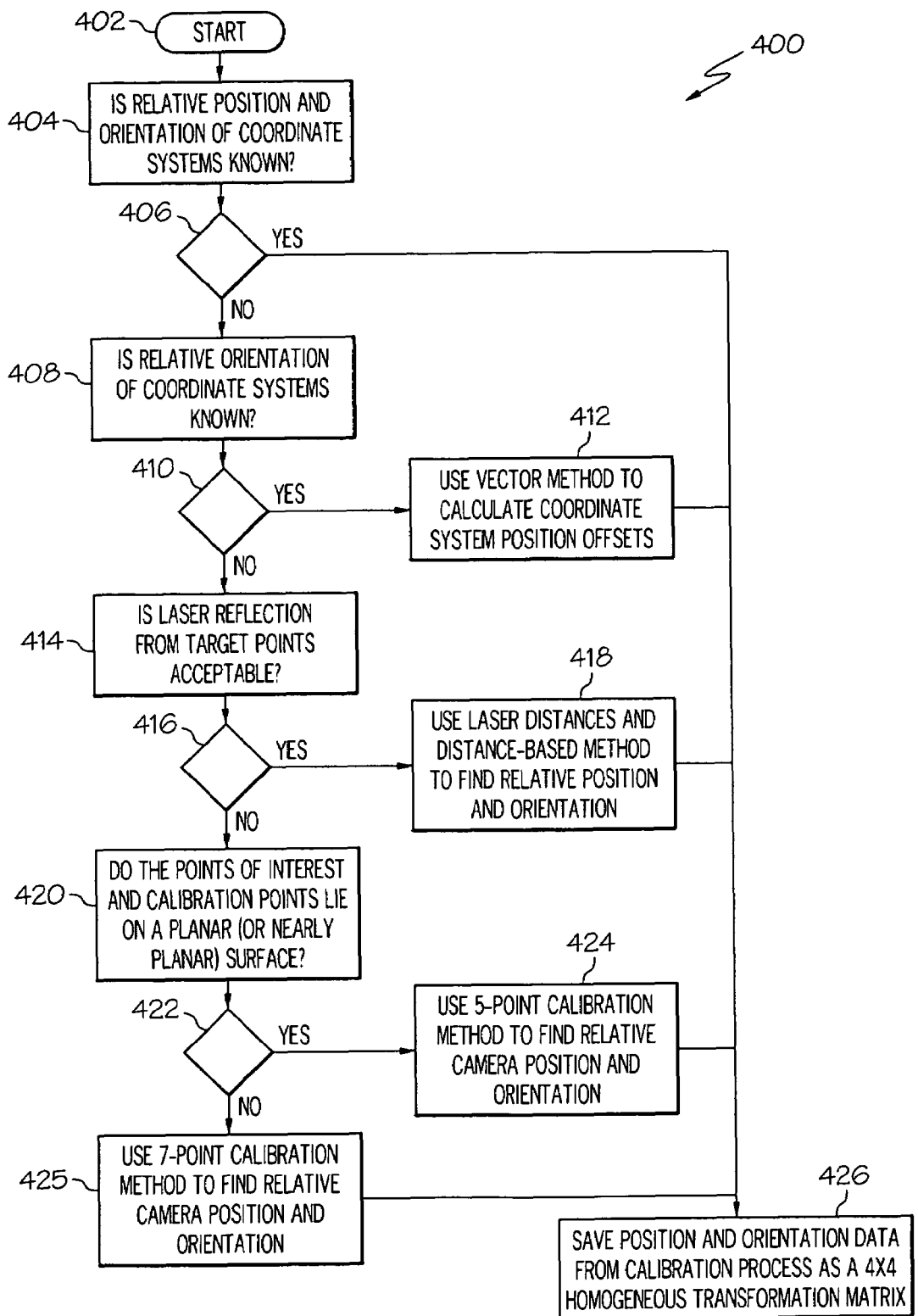
FIG. 4 is a flow diagram which illustrates alternative steps implemented to generate a camera pose transformation matrix.

Referring next to FIG. 4, a flow diagram 400 which illustrates steps implemented to generate a camera pose transformation matrix according to an alternative illustrative embodiment of the repair and maintenance method is shown. The method 400 begins at block 402 in FIG. 4. In block 404, a determination is made as to whether the relative position and orientation of coordinate systems is known. If the answer to the query in block 404 is known in block 406, then the position and orientation data from the calibration process may be saved as a 4×4 homogeneous transformation matrix in block 426.

If the answer to the query posed in block 404 is "no" in block 406 (at least one of the relative position and orientation of coordinate systems is unknown), then a determination may be made as to whether the relative orientation of coordinate systems is known in block 408. If the answer to the question posed in block 408 is "yes" in block 410 (the relative orientation of coordinate systems is known), then a vector method may be used to calculate coordinate system position offsets in block 412. If the answer to the question posed in block 408 is "no" in block 410 (the relative orientation of coordinate systems is not known), then a determination may be made in block 414 as to whether laser reflections from target points on a target object are acceptable.

If the answer to the query posed in block 414 is "yes" in block 416 (the laser reflections from the target points on the target object are acceptable), then the laser distances and a distance-based method may be used to find both the relative position and orientation of camera relative to the target object in block 418. If the outcome of the query which is posed in block 414 is "no" in block 416 (the laser reflections from the target points on the target object are not acceptable), then a query is made as to whether the calibration points and the points of interest lie on a planar or nearly planar surface. If the answer to the query posed in block 420 is "no" in block 422 (the calibration points and the points of interest do lie on a planar or nearly planar surface), then a 5-point calibration method may be used to find the position and orientation of the camera relative to the target object in block 424. The method may then proceed to block 426, in which the position and orientation data from the calibration process may be saved as a 4×4 homogeneous transformation matrix. If the answer to the query posed in block 420 is "no" in block 422, then a 7-point calibration method may be used to find the position and orientation of the camera relative to the target object in block 425. The method may then proceed to block 426, in which the position and orientation data from the calibration process may be saved as a 4×4 homogeneous transformation matrix.

Figure 5:
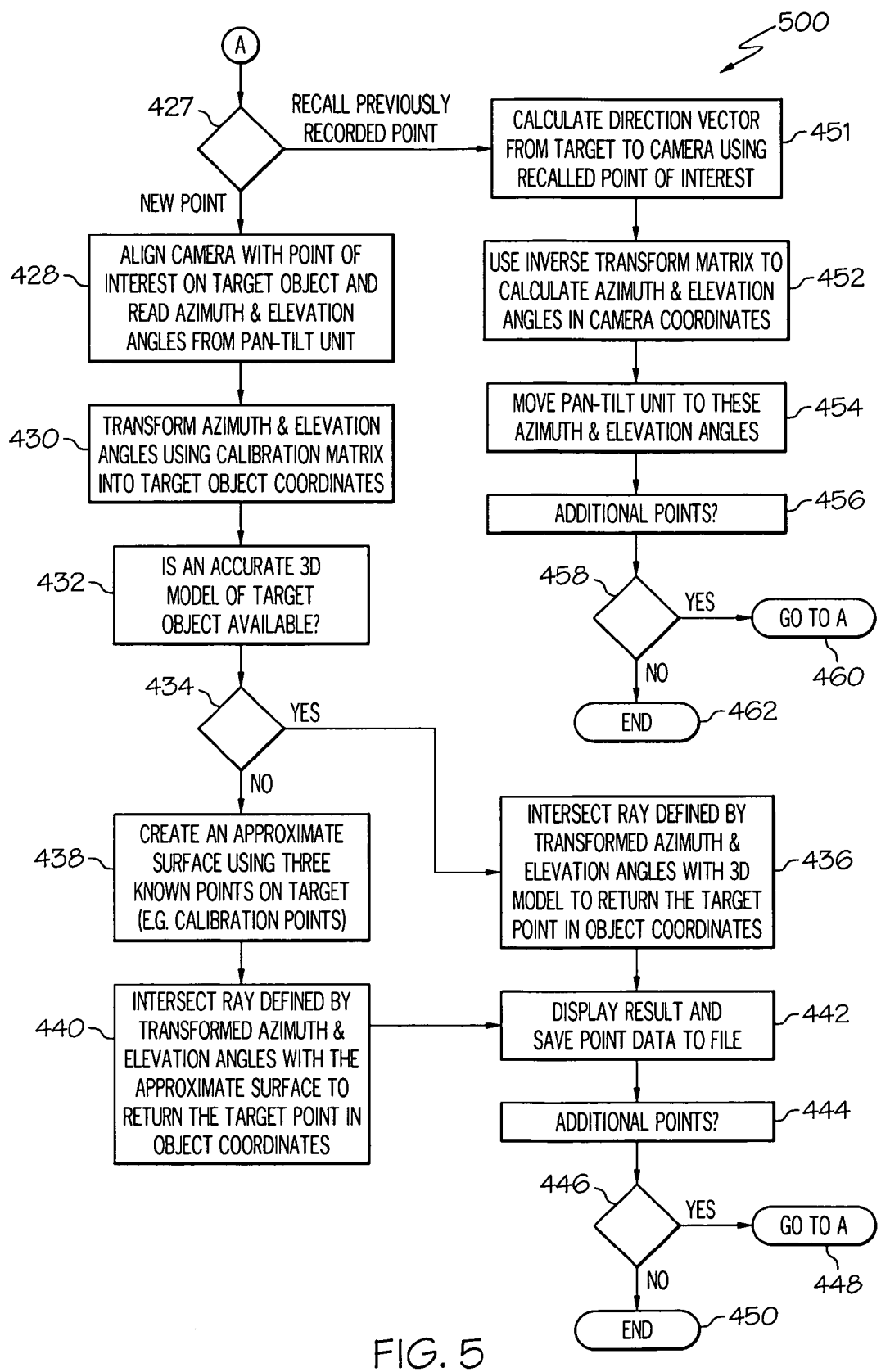
FIG. 5 is a continuation of the flow diagram of FIG. 4 which illustrates steps implemented to locate a desired position on a target object.

Referring next to FIG. 5, a flow diagram 500, which is a continuation of the flow diagram in FIG. 4, illustrates steps implemented to locate a desired position of interest on a target object is shown. After the position and orientation data from the calibration process are saved as a 4×4 homogeneous transformation matrix in block 426 of FIG. 4, if the answer to the query posed in block 427 is "new point", then in block 428 a camera may be aligned by the pan-tilt unit with a point of interest on a target object and azimuth and elevation angles of the camera (which defines the direction vector 12) may be determined. In block 430, the azimuth and elevation angles determined in block 428 may be transformed into target object coordinates using the calibration matrix which was saved in block 426 of FIG. 4. In block 432, a determination is made as to whether an accurate three-dimensional model of the target object is available. If the answer to the query posed in block 432 is "yes" in block 230 (an accurate 3-D model of the target object is available), then direction vector 12 defined by the azimuth and elevation angles, is transformed into the coordinate system of the target object by the calibration matrix and is then intersected with the 3-D model of the target object to return the target point in object coordinates in block 436. The result of the calculation made in block 436 may be displayed and the point data may be saved to file in block 442. In block 444, a query may be made as to whether additional points of interest on the target object are necessary. If additional points of interest on the target object are necessary (block 446), then the method may return to block 427 via block 448. If additional points of interest on the target object are not necessary (block 446), then the method may end at block 450.

If the answer to the query posed in block 427 is "recall previously recorded point", then the desired point of interest is from entered (e.g. selected from the CAD model, entered from the keyboard, or recalled from storage in another manner) and is used to calculate the direction vector 12 from the position on the target object to the camera in block 451. This direction vector is then converted into azimuth and elevation angles in camera coordinates using the inverse of the camera calibration transformation matrix in block 452. The pan-tilt unit is then moved to these angles in block 454. In block 456, a query may be made as to whether additional points of interest on the target object are necessary. If the answer to the query posed in block 456 is "yes" in block 458 (additional points of interest on the target object are necessary), then the method may return to block 427 via block 460. If the answer to the query posed in block 456 is "no" in block 458 (additional points of interest on the target object are not necessary), then the method may end at block 462.

If the answer to the query posed in block 432 is "no" in block 434 (an accurate 3-D model of the target object is not available), then an approximate surface using three known points (such as calibration points) on the target object may be created in block 438. Next, in block 440 the direction vector 12, which is defined by the transformed azimuth and elevation angles, may be transformed by the calibration matrix saved in block 426 and then intersected with the approximate surface which was created in block 438 to return the target point in object coordinates. The result of the calculation made in block 440 may be displayed and the point data may be saved to file in block 442. In block 444, a query may be made as to whether additional points of interest on the target object are necessary. If the answer to the query posed in block 444 is "yes" in block 446 (additional points of interest on the target object are necessary), then the method may return to block 428 via block 448. If the answer to the query posed in block 444 is "no" in block 446 (additional points of interest on the target object are not necessary), then the method may end at block 450.

Figure 6:
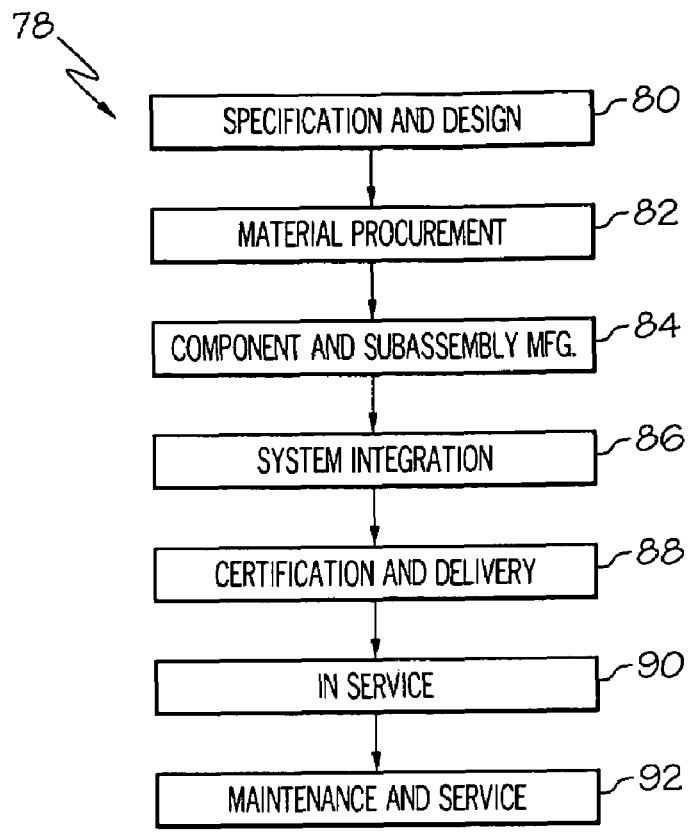
FIG. 6 is a flow diagram of an aircraft production and service methodology.
Figure 7:
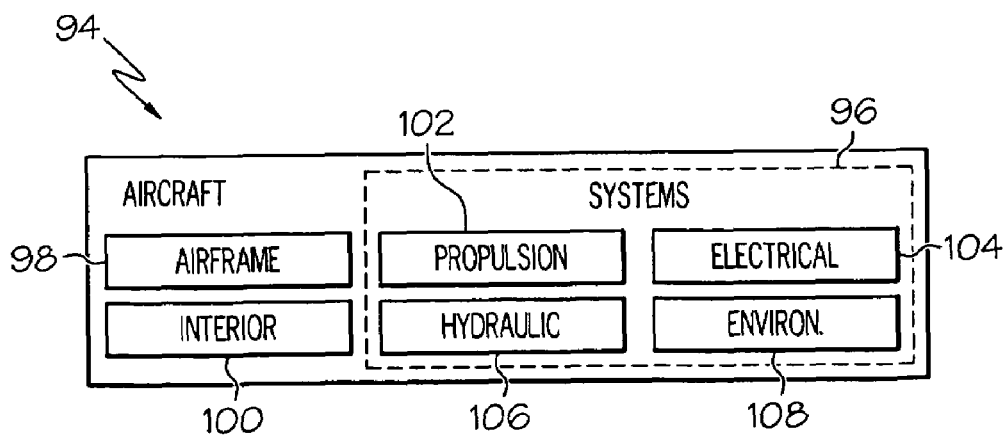
FIG. 7 is a block diagram of an aircraft.

Referring next to FIGS. 6 and 7, embodiments of this invention may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive, architectural, and ship building industries.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92. One or more apparatus embodiments may be used as part of a real-time airplane health management system.

Figure 8:
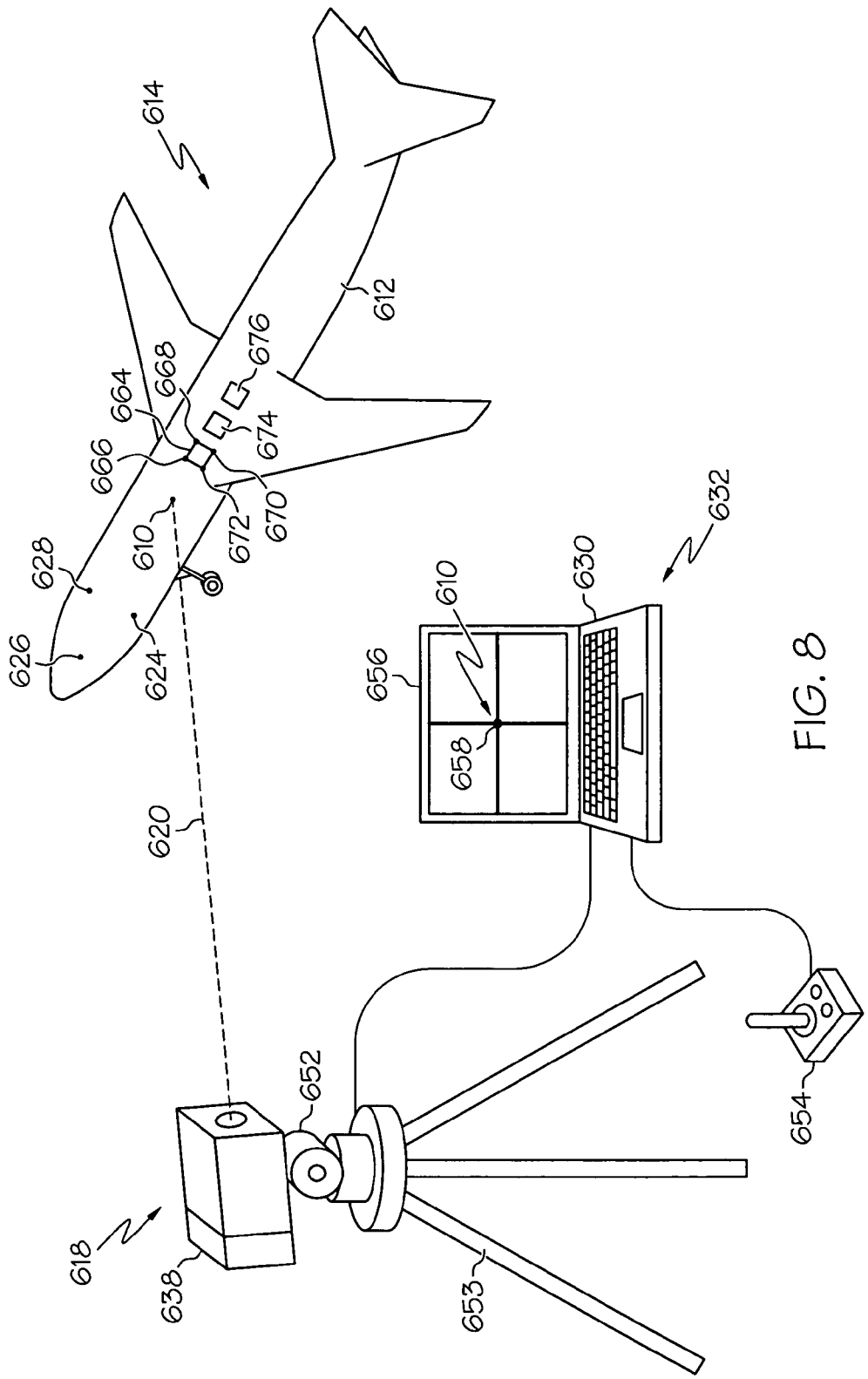
FIG. 8 is a schematic, perspective view of an illustrative embodiment of a pointing instrument, a computer operatively connected to the pointing instrument, and a target object, wherein the target object is an airplane.

With reference to the illustrative embodiment of FIG. 8, a first method is for determining a position of a point of interest 610 on a surface 612 of a target object 614 having a target object coordinate system 616 (see FIG. 9) using a pointing instrument 618 having an aim point axis 620 and having an instrument coordinate system 622 (see FIG. 9). The first method includes measuring an orientation of the aim point axis 620 in the instrument coordinate system 622 when the aim point axis 620 of the instrument 618 is in turn aligned with each of three calibration points 624, 626 and 628 on the surface 612 of the target object 614, wherein positions of the three calibration points 624, 626 and 628 in the target object coordinate system 616 are known. The first method also includes measuring a distance (i.e., range) substantially along the aim point axis 620 from the instrument 618 to each of the three calibration points 624, 626 and 628. The first method also includes calculating a calibration matrix which transforms a position defined in the instrument coordinate system 622 to a position defined in the target object coordinate system 616 using at least the measured orientation and distance in the instrument coordinate system 622 corresponding to the three calibration points 624, 626 and 628 and the known positions of the three calibration points 624, 626 and 628 in the target object coordinate system 616. The first method also includes measuring an orientation of the aim point axis 620 in the instrument coordinate system 622 when the aim point axis 620 of the instrument 618 is aligned with the point of interest 610. The first method also includes calculating a position of the point of interest 610 in the target object coordinate system 616 using at least the measured orientation of the aim point axis 620 in the instrument coordinate system 622 corresponding to the point of interest 610, the calibration matrix, and at least one of a distance substantially along the aim point axis 620 from the instrument 618 to the point of interest 610 and a model of the surface 612 of the target object 614 in the target object coordinate system 616. The first method also includes storing the calculated position.

In one application of the FIG. 8—referenced first method, the calibration matrix is calculated using no additional measurement of orientation of the aim point axis to another calibration point whose position is known in the target object coordinate system and using no additional measurement of distance substantially along the aim point axis from the instrument to another calibration point whose position is known in the target object coordinate system.

Referring to FIG. 9, when the coordinates of a point P in the instrument coordinate system 622 are spherical coordinates of pan (i.e., the pan angle 634 in FIG. 9 of a vector $^AP$ to the point P), tilt (the tilt angle 636 in FIG. 9 of the vector $^AP$ to the point P), and range (the distance along the vector $^AP$ to the point P in FIG. 9), the position of the point P represented as spherical coordinates in the instrument coordinate system 622 is related to the position of the point P in X, Y, Z Cartesian coordinates in the instrument coordinate system 622 from the following equations for the forward kinematics of the instrument 618:

$X = \text{Range} * \cos(\text{pan}) * \cos(\text{tilt})$ $Y = \text{Range} * \sin(\text{pan}) * \cos(\text{tilt})$ $Z = \text{Range} * \sin(\text{tilt})$ where pan (azimuth) is rotation about the Z axis and tilt (elevation) is rotation about the Y axis in the instrument coordinate system 622.

It is noted that the position of the point P represented as Cartesian coordinates (X, Y, Z) in the instrument coordinate system 622 is related to the position of the point P represented as spherical coordinates (pan, tilt, range) in the instrument coordinate system 622 from the following equations for the inverse kinematics of the instrument 618:

$\text{pan} = \tan(Y, X)^{-1}$ $\text{tilt} = \tan(Z, \sqrt{X^2 + Y^2})^{-1}$ $\text{Range} = \sqrt{X^2 + Y^2 + Z^2}$ In one implementation of the FIG. 8—referenced first method, a position $^BP$ (which is represented as a column vector in the form $[X, Y, Z, 1]^T$) in the target object coordinate system 616 is calculated from a position $^AP$ (also a column vector in the form $[X, Y, Z, 1]^T$) in the instrument coordinate system 622 from the equation:

$^BP = {^B_A}T \, ^AP$ where T is the calibration matrix. In one example, the calibration matrix is a 4×4 homogeneous transformation matrix having the form:

$$^B_A T = \begin{bmatrix} r_{11} & r_{12} & r_{13} & X \\ r_{21} & r_{22} & r_{23} & Y \\ r_{31} & r_{32} & r_{33} & Z \\ 0 & 0 & 0 & 1 \end{bmatrix}$$

It is noted that a position $^AP$ in the instrument coordinate system 622 can be calculated from a position $^BP$ in the target object coordinate system 616 using the inverse of the calibration matrix from the equation:

$$^AP = (_A^BT)^{-1}\, ^BP = _B^AT\, ^BP$$

In one illustration, the three calibration points 624, 626 and 628 are non-colinear, and the calibration matrix is calculated as follows:

$$\vec{n}_A = \vec{V}_{A12} \times \vec{V}_{A13}$$

$$\vec{n}_B = \vec{V}_{B12} \times \vec{V}_{B13}$$

$$\vec{k}_1 = \vec{n}_A \times \vec{n}_B$$

$$\theta_1 = \alpha\cos(|\vec{n}_A| \cdot |\vec{n}_B|)$$

$$R_1 = f_1(|\vec{k}_1|, \theta_1)$$

$$\vec{k}_2 = \vec{V}_{A12} \times \vec{V}_{B12}$$

$$\theta_2 = \alpha\cos(|\vec{V}_{A12}| \cdot |\vec{V}_{B12}|)$$

$$R_2 = f_1(51\,\vec{k}_2|, \theta_2)$$

$$R_{12} = R_1 R_2$$

$$_A^BT = [R_{12},\, [R_1 \vec{V}_{B12} - \vec{V}_{A12}]^T]$$

$$_B^AT = (_A^BT)^{-1}$$

wherein, referring to FIGS. 10-12:

$\vec{V}_{A12}$ is the vector in coordinate system A created from points $\vec{P}_{A1}$ and $\vec{P}_{A2}$ (i.e., $\vec{V}_{A12} = \vec{P}_{A2} - \vec{P}_{A1}$);

vectors $\vec{V}_{A13}$, $\vec{V}_{B12}$, $\vec{V}_{B13}$ follow the same format;

$\vec{n}_A$ and $\vec{n}_B$ are the normals created from the vector cross products;

$\vec{k}_1$ and $\vec{k}_2$ are axes of rotation;

$\theta_1$ and $\theta_2$ are rotation angles about axes $\vec{k}_1$ and $\vec{k}_2$, respectively;

$R_1$, $R_2$, and $R_{12}$ are 3×3 symmetric rotation matrices; and $f_1(\,)$ is the function (known to those skilled in the art and described, for example, in "Introduction to Robotics: Mechanics and Control", 3rd edition, by John J. Craig and published July 2004 by Prentice Hall Professional Technical Reference) which generates a 3×3 rotation matrix from the angle-axis definition described below:

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

where $c\theta = \cos(\theta)$, $s\theta = \sin\theta$, $v\theta = 1 - \cos(\theta)$, and $\hat{k} = [k_x, k_y, k_z]$.

Note that the 4×4 homogeneous calibration matrix $_A^BT$ only needs to be computed once for any position of the pointing instrument 618 relative to the target object 614, and $_A^BT$ can then be used to convert any number of vectors from coordinate system A (the instrument coordinate system 622) into coordinate system B (the target object coordinate system 616). It is also noted that the inverse calibration matrix $_B^AT$ can be calculated by calculating the inverse of the calibration matrix $_A^BT$ or can be calculated directly by switching the order of the vectors in the first equations of the previous paragraph.

In one enablement of the FIG. 8—referenced first method, the model of the surface 612 of the target object 614 in the target object coordinate system 616 is a 3-D CAD model of the target object 614. In a different enablement, the model of the surface 612 of the target object 614 in the target object coordinate system 616 is an approximate surface created using the three calibration points 624, 626 and 628 or other points on the surface of the target object which have positions known in the target object coordinate system and which are near the point of interest. In one example, a ray (i.e., a straight line in a specific direction) defined in Cartesian coordinates in the instrument coordinate system 622 is created using forward kinematics of the instrument 618 and the measured pan and tilt angles 634 and 636 in spherical coordinates in the instrument coordinate system 622, wherein the measured pan and tilt angles 634 and 636 correspond to the point of interest 610. Then, the ray is transformed into the target object coordinate system 616 using the calibration matrix. Then, the point of intersection of the ray in the target object coordinate system 616 with the model of the surface 612 of the target object 614 in the target object coordinate system 616 is calculated, wherein such point of intersection is the point of interest 610 defined in the target object coordinate system 616.

In a different enablement, a model of the surface 612 of the target object 614 is not used. Instead, the distance (range) substantially along the aim point axis 620 from the instrument 618 to the point of interest 610 is measured (such as with a laser range finder 638), the position of the point of interest 610 defined in Cartesian coordinates in the instrument coordinate system 622 is calculated using forward kinematics of the instrument 618 and the measured pan and tilt angles 634 and 636 and distance corresponding to the point of interest 610 defined in spherical coordinates in the instrument coordinate system 622, and the calibration matrix is used to transform the position of the point of interest 610 defined in Cartesian coordinates in the instrument coordinate system 622 to the position of the point of interest 610 defined in Cartesian coordinates in the target object coordinate system 616. In a different enablement, both a model of the surface 612 of the target object 614 and a measured distance from the instrument 618 to the point of interest 610 are used.

In one variation, the stored calculated position is stored in computer memory 630 of a computer 632 which is operably connected to the instrument 618 to at least receive signals corresponding to distance and orientation measurements of the aim point axis 620 of the instrument 618 in the instrument coordinate system 622 and to perform the previously described operations to calculate the position of the point of interest 610 in the target object coordinate system 616.

In one employment of the FIG. 8—referenced first method, measuring an orientation of the aim point axis 620 in the instrument coordinate system 622 includes measuring a pan angle 634 and a tilt angle 636 of the aim point axis 620 of the instrument 618 in the instrument coordinate system 622, wherein the surface 612 of the target object 614 is three dimensional, and wherein the calibration matrix is a 4×4 homogeneous transformation matrix.

In one arrangement of the FIG. 8—referenced first method, the distance measurements are made using a laser range finder (also known as a laser range meter) 638. In the same or a different arrangement, the instrument includes a laser 640 (in one variation having laser range finding capability), and the aim point axis is a laser beam 642 of the laser 640 as shown in the illustrative embodiment of FIG. 13. In the same or a different arrangement, the instrument includes a video camera 644 having zoom capability (and in one variation a laser range finder 638), and the aim point axis is an aim point axis 646 of the video camera 644 as shown in FIG. 14. In the same or a different arrangement, the instrument includes a telescope 648 (and in one variation a laser range finder 638), and the aim point axis is an aim point axis 650 of the telescope 648 as shown in FIG. 15. In one example, the target object 614 is an airplane, and the point of interest 610 requires repair.

In one construction involving the FIG. 8—referenced first method, the instrument 618 includes a pan-tilt unit 652 which is supported by a tripod 653 and which is operably attached to the instrument 618 to allow the instrument to be rotated in pan and tilt. In one variation, the instrument is a video camera 644 equipped with a laser range finder 638, and the computer 632 includes a joy stick input device 654 and a monitor 656. In one modification, the computer 632 is programmed to control the pan-tilt unit 652 through the joy stick input device 654, to display a field of view of the video camera 644 on the monitor 656, to overlay a representation 658 (such as the center of cross-hairs) of the aim point axis 620 on the display, and to measure the pan and tilt angles 634 and 636 (and distance for the calibration matrix) when a user of the joy stick input device 654 aligns the representation 658 of the aim point axis 620 on the display with the point of interest 610 on the display and indicates such alignment to the computer 632. In another construction, the tripod is replaced with a rigid attachment of the instrument 618 to a building wall, ceiling, etc.

With reference to the illustrative embodiment of FIG. 8, a second method is for determining an orientation of an aim point axis 620 of a pointing instrument 618 having an instrument coordinate system 622 (see FIG. 9) for the aim point axis 620 of the instrument 618 to be aligned with a point of interest 610 on a surface 612 of a target object 614 having a target object coordinate system 616 (see FIG. 9), wherein a position of the point of interest 610 in the target object coordinate system 616 is known. The second method includes calculating an inverse calibration matrix which transforms a position defined in the target object coordinate system 616 to a position defined in the instrument coordinate system 622. The second method includes calculating the orientation of the aim point axis 620 of the instrument 618 in the instrument coordinate system 622 using at least the inverse calibration matrix, the position of the point of interest 610 in the target object coordinate system 616, and inverse kinematics of the instrument 618. The second method includes rotating the aim point axis 620 of the instrument 618 to the calculated orientation.

It is noted that the applications, implementations, illustrations, enablements, employments, arrangements, etc. of the FIG. 8—referenced first method are equally applicable to the FIG. 8—referenced second method. Methods for rotating the aim point axis 620 include, without limitation, manually rotating the instrument 618, rotating the instrument 618 using controllable actuators of a pan-tilt unit 652, rotating the aim point axis 620 using mirror deflection, etc. In one variation, the orientation of the aim point axis 620 of the instrument 618 in the instrument coordinate system 622 is calculated using only the inverse calibration matrix, the position of the point of interest 610 in the target object coordinate system 616, and inverse kinematics of the instrument 618. In one enactment of the FIG. 8—referenced second method, the computer 632 is programmed to control the pan-tilt unit 652 to rotate the aim point axis 620 of the instrument 618 to the calculated orientation. In one example, the calibration matrix is calculated as in the FIG. 8—referenced first method. In another example, the calibration matrix is calculated in a different manner from the FIG. 8—referenced first method, such as by using a 5-point or a 7-point image-based method. In one illustration, the target object 614 is an airplane, and the point of interest 610 is a point which has been previously repaired or previously identified for repair.

With reference to the illustrative embodiment of FIG. 8, and substituting the laser 640 and the laser beam 642 of FIG. 13 for the pointing instrument 618 and the aim point axis 620 in FIG. 8, a third method is for controlling orientation of a laser beam 642 of a laser 640 having an instrument coordinate system 622 for the laser beam 642 to trace an image 664 on a surface 612 of a target object 614 having a target object coordinate system 616 (see FIG. 9), wherein positions of points 666, 668, 670 and 672 for the image 664 on the surface 612 of the target object 614 in the target object coordinate system 616 are known. The third method includes calculating an inverse calibration matrix which transforms a position defined in the target object coordinate system 616 to a position defined in the instrument coordinate system 622. The third method also includes calculating orientations of the laser beam 642 of the laser 640 in the instrument coordinate system 622 using at least the inverse calibration matrix, the positions of the points 666, 668, 670 and 672 for the image 664 on the surface 612 of the target object 614 in the target object coordinate system 616, and inverse kinematics of the instrument 618. The third method also includes rotating the laser beam 642 to the calculated orientations to trace the image 664 on the surface 612 of the target object 614.

It is noted that the applications, implementations, illustrations, enablements, employments, arrangements, etc. of the FIG. 8—referenced first method are equally applicable to the FIG. 8—referenced third method. Methods for rotating the laser beam 642 include, without limitation, rotating the laser 640 using controllable actuators of a pan-tilt unit 652, rotating the laser beam 642 using mirror deflection, etc. In one variation, orientations of the laser beam 642 of the laser 640 in the instrument coordinate system 622 are calculated using only the inverse of the calibration matrix, the positions of the points 666, 668, 670 and 672 for the image 664 on the surface 612 of the target object 614 in the target object coordinate system 616, and inverse kinematics of the instrument 618. In one example, the calibration matrix is calculated as in the FIG. 8—referenced first method. In another example, the calibration matrix is calculated in a different manner from the FIG. 8—referenced first method, such as by using a 5-point or a 7-point image-based method.

In one implementation of the FIG. 8—referenced third method, the calculated orientations of the laser beam 642 in the instrument coordinate system 622 include calculated pairs of pan and tilt angles 634 and 636 of the laser beam 642 in the instrument coordinate system 622, wherein the target object 614 is three dimensional, and wherein the calibration matrix is a 4×4 homogeneous transformation matrix. In one enactment, the computer 632 is programmed to control the pan-tilt unit 652 to rotate the laser beam 642 of the laser 640 to the calculated orientations.

In one application of the FIG. 8—referenced third method, the laser 640 is a laser projector. In one variation, the traced image 664 is a perimeter of a figure. In the same or a different variation, the traced image 664 is a filled-in figure.

In one modification of the FIG. 8—referenced third method, the calculated pairs of pan and tilt angles 634 and 636 have been adjusted for the laser beam 642 to trace a perspective-corrected image 664 on the surface 612 of the target object 614 for an image viewing location which is different from a location of the laser 640.

In one illustration of the FIG. 8—referenced third method, the target object 614 is an airplane, and the third method also includes superimposing a painted figure 674 or a decal 676 on the image on the surface 612 of the airplane. In a different illustration, the image 664 is an outline of a part under the surface 612 of the airplane or the contour of a damaged or previously repaired area on the surface 612 of the airplane.

FIGS. 16A, 16B, and 16C together depict an illustration of a process flow diagram which describes one example of a particular method involving initial calibration and position targeting. Note that in this process it is possible to loop through a series of points (such as between tags "A" and "Goto A" in FIGS. 16A and 16C). This makes it possible to generate continuous movement of the laser spot on the target object 614. If the laser movement is fast enough, the projected image 664 will appear to be continuous line or arc segments. When processing a series of points, the laser can also be turned off and on programmatically to create gaps in the line or arc segments.

In one variation of any of the FIGS. 8 and-16-referenced methods, the source of the 3D data points on the object of interest that will be targeted by the laser can come from a list recorded by this system during previous analysis, or any other application involving 3D data of the object. For example, if a CAD/CAM application creates G-code for a CNC machining task, it would be possible to use that code to draw with the laser the path that the cutter takes on the part. This could be useful in verifying a G-code script without taking the actual CNC machine out of service. Drawing with other graphics-based formats (like PostScript vectors or OpenGL lines) would also be possible.

In one modification of any of the FIGS. 8—and 16-referenced methods, when the instrument includes a video camera, the system can be set up to be controlled remotely through a network socket connection from another computer or connected through a web server allowing control from any web browser. The remote user could use the remote access to send images back from the camera to perform the calibration, interactively specify target points, or simply to play through a series of points. Since many handheld wireless devices have web browsers, this type of control would be available to users in a wide variety of locations.

In one example of any of the FIGS. 8—and 16-referenced methods, when an image is to be traced on the surface of the target object, the system is set up to draw a closed contour around a region of interest. In that situation, the area in which the path must follow is rigidly defined, but in other cases, such as drawing 3D shapes and text, the path can be modified to compensate for laser and viewer positions. In cases where the image being projected needs to be viewed from a location other than from a viewpoint perpendicular to the surface, it may be useful to compute a perspective-corrected view.

The viewpoint and the projection point relative to the target surface can be computed using one or more of the previously described methods. Since we know what the shape of the surface is (from CAD), we can make contours of specific shapes on that surface that appear to be in the correct proportion from other specific viewpoints. Street artists use this trick when drawing images on sidewalks or buildings that look like perfect perspective images from one viewpoint, but look very strange from all others. Another example is the text printed on street near stop signs that says "STOP". The text on the street looks correct from the point of view of the driver (see FIG. 17), but the text looks stretched out when viewed from directly above (see FIG. 18).

This technique can be used to project text or vector-based images onto a surface by a laser when the viewer and projector are in different positions relative to the target surface, and still present the viewer with a correct image from his or her point of view. The method described here provides the tools to set up and use this type of environment.

An illustrative application using the view-corrected display concept is shown in FIG. 19. In this situation, the task is to draw text on a non-planar surface 710 from a laser unit 712 positioned in a different location than the viewer 714. With the laser position and orientation relative to the object 716 and relative to the viewer 714 determined by the previously-described calibration process, the path of the laser beam 718 can be calculated to give the proper view 720 (i.e., a perspective-corrected view) of the image 722 (the letter "E" in this case) being drawn on the surface 710 of the object 716. When a full 3D surface model is not available, the system can be used to capture multiple surface points 724 on the object (near the area in which the text or other display objects will be drawn) to approximate the 3D surface in software for the projection calculation.

An example of the sequence of steps in setting up this type of view dependent rendering are: (1) perform instrument-to-object calibration using the instrument at the laser projection location; (2) using the instrument, measure the outline of a surface area or areas on which the image will be displayed; (3) perform viewer-to-object calibration using the instrument at the viewer location; (4) compute the perspective transform between the viewer location and image projected onto each surface using the instrument-to-object and viewer-to-object calibration matrices; and (5) render the image onto each facet of the projection surface (this will be the desired image rendered on each surface as if projected from the viewers point of view, then transformed into the instrument coordinate system).

Several benefits and advantages are derived from one or more of the first, second, and third methods. In one example of the first method, using just three calibration points allows for a faster method and less costly instrument for determining the position of the point of interest in the target object coordinate system from its position in the instrument coordinate system. In one example of the second method, using the inverse of a calibration matrix allows for a faster method and less costly instrument for orientating the instrument in the instrument coordinate system to align the aim point axis with a point of interest having a position known in the target object coordinate system. In one example of the third method, using the inverse of a calibration matrix should allow for a faster method and less costly instrument for orientating a laser in the instrument coordinate system to trace an image on a target object when positions of points for the image on the surface of the target object in the target object coordinate system are known. In the same or a different example of the third method, the traced image is a perspective-corrected image on the surface of a three-dimensional target object.

The foregoing description of several methods and systems has been presented for purposes of illustration. It is not intended to be exhaustive or to limit the methods and systems to the precise forms and steps disclosed, and obviously many modifications and variations are possible in light of the above teaching. It is intended that the scope of the invention be defined by the claims appended hereto.

What is claimed is:

1. A method for determining a position of a point of interest on a surface of a target object having a target object coordinate system using a pointing instrument having an aim point axis and having an instrument coordinate system, wherein the method comprises:
  a) measuring an orientation of the aim point axis in the instrument coordinate system when the aim point axis of the instrument is in turn aligned with each of three calibration points on the surface of the target object, wherein positions of the three calibration points in the target object coordinate system are known;
  b) measuring a distance substantially along the aim point axis from the instrument to each of the three calibration points;
  c) calculating a calibration matrix which transforms a position defined in the instrument coordinate system to a position defined in the target object coordinate system using at least the measured orientation and distance in the instrument coordinate system corresponding to the three calibration points and the known positions of the three calibration points in the target object coordinate system;
  d) measuring an orientation of the aim point axis in the instrument coordinate system when the aim point axis of the instrument is aligned with the point of interest;
  e) calculating a position of the point of interest in the target object coordinate system using at least the measured orientation of the aim point axis in the instrument coordinate system corresponding to the point of interest, the calibration matrix, and at least one of a distance substantially along the aim point axis from the instrument to the point of interest and a model of the surface of the target object in the target object coordinate system; and
  f) storing the calculated position.

2. The method of claim 1, wherein measuring an orientation of the aim point axis in the instrument coordinate system includes measuring a pan angle and a tilt angle of the aim point axis of the instrument in the instrument coordinate system, wherein the surface of the target object is three dimensional, and wherein the calibration matrix is a 4×4 homogeneous transformation matrix.

3. The method of claim 2, wherein the distance measurements are made using a laser range finder.

4. The method of claim 2, wherein the instrument includes a laser, and wherein the aim point axis is a laser beam of the laser.

5. The method of claim 2, wherein the instrument includes a video camera, and wherein the aim point axis is an aim point axis of the video camera.

6. The method of claim 2, wherein the instrument includes a telescope, and wherein the aim point axis is an aim point axis of the telescope.

7. The method of claim 1, wherein the target object is an airplane, and wherein the point of interest requires repair.

8. A method for determining an orientation of an aim point axis of a pointing instrument having an instrument coordinate system for the aim point axis of the instrument to be aligned with a point of interest on a surface of a target object having a target object coordinate system, wherein a position of the point of interest in the target object coordinate system is known, and wherein the method comprises:
  a) calculating an inverse calibration matrix which transforms a position defined in the target object coordinate system to a position defined in the instrument coordinate system;
  b) calculating the orientation of the aim point axis of the instrument in the instrument coordinate system using at least the inverse calibration matrix, the position of the point of interest in the target object coordinate system, and inverse kinematics of the instrument; and
  c) rotating the aim point axis of the instrument to the calculated orientation.

9. The method of claim 8, wherein the orientation of the aim point axis of the instrument in the instrument coordinate system includes a pan angle and a tilt angle of the aim point axis of the instrument in the instrument coordinate system, wherein the surface of the target object is three dimensional, and wherein the calibration matrix is a 4×4 homogeneous transformation matrix.

10. The method of claim 9, wherein the instrument includes a laser, and wherein the aim point axis is a laser beam of the laser.

11. The method of claim 9, wherein the instrument includes a video camera, and wherein the aim point axis is an aim point axis of the video camera.

12. The method of claim 9, wherein the instrument includes a telescope, and wherein the aim point axis is an aim point axis of the telescope.

13. The method of claim 9, wherein the target object is an airplane.

14. The method of claim 13, wherein the point of interest is a point which has been previously repaired or previously identified for repair.

15. A method for controlling orientation of a laser beam of a laser having an instrument coordinate system for the laser beam to trace an image on a surface of a target object having a target object coordinate system, wherein positions of points for the image on the surface of the target object in the target object coordinate system are known, and wherein the method comprises:
  a) calculating an inverse calibration matrix which transforms a position defined in the target object coordinate system to a position defined in the instrument coordinate system;
  b) calculating orientations of the laser beam of the laser in the instrument coordinate system using at least the inverse calibration matrix, the positions of the points for the image on the surface of the target object in the target object coordinate system, and inverse kinematics of the instrument; and
  c) rotating the laser beam to the calculated orientations to trace the image on the surface of the target object.

16. The method of claim 15 wherein the calculated orientations of the laser beam in the instrument coordinate system include calculated pairs of pan and tilt angles of the laser beam in the laser beam coordinate system, wherein the target object is three dimensional, and wherein the calibration matrix is a 4×4 homogeneous transformation matrix.

17. The method of claim 16, wherein the traced image is a perimeter of a figure.

18. The method of claim 16, wherein the traced image is a filled-in figure.

19. The method of claim 16, wherein the calculated pairs of pan and tilt angles have been adjusted for the laser beam to trace a perspective-corrected image on the surface of the target object for an image viewing location which is different from a location of the laser.

20. The method of claim 16, wherein the target object is an airplane, and also including superimposing a painted figure or a decal on the image on the surface of the airplane.

* * * * *